(12) United States Patent
Graham et al.

(10) Patent No.: US 8,377,287 B2
(45) Date of Patent: Feb. 19, 2013

(54) METHODS AND SYSTEMS FOR PRODUCING REDUCED RESID AND BOTTOMLESS PRODUCTS FROM HEAVY HYDROCARBON FEEDSTOCKS

(75) Inventors: Robert Graham, Ottawa (CA); Barry Freel, Greely (CA)

(73) Assignee: Ivanhoe Energy, Inc., Vancouver, British Columbia (CA)

( * ) Notice: Subject to any disclaimer, the term of this patent is extended or adjusted under 35 U.S.C. 154(b) by 474 days.

(21) Appl. No.: 12/046,363

(22) Filed: Mar. 11, 2008

(65) Prior Publication Data

US 2008/0230440 A1     Sep. 25, 2008

(51) Int. Cl.
C10G 9/26 (2006.01)

(52) U.S. Cl. ............. 208/126; 208/73; 208/75; 208/91; 208/113; 208/127; 208/153; 208/226; 208/251 R; 208/299; 208/307; 208/419; 208/420

(58) Field of Classification Search .................. 208/126, 208/73, 75, 91, 113, 127, 153, 226, 251 R, 208/299, 307, 419, 420
See application file for complete search history.

(56) References Cited

U.S. PATENT DOCUMENTS

| 2,852,439 | A | 9/1958 | Jahnig et al. | |
|---|---|---|---|---|
| 2002/0100711 | A1* | 8/2002 | Freel et al. | 208/14 |
| 2003/0051988 | A1* | 3/2003 | Gunnerman et al. | 44/904 |
| 2004/0069686 | A1* | 4/2004 | Freel et al. | 208/226 |

FOREIGN PATENT DOCUMENTS

| CO | 5540064 | 4/2003 |
|---|---|---|
| EP | 0 323 297 A1 | 7/1989 |
| ES | 2282737 T3 | 10/2007 |
| RU | 2083638 C | 7/1997 |
| RU | 2004 109 519 A | 10/2005 |
| RU | 2323246 C | 10/2005 |
| RU | 2 263 702 C1 | 11/2005 |
| WO | WO 00/61705 A | 10/2000 |

OTHER PUBLICATIONS

Edward F. Leonard, Benjamin W. Niebel, "Process engineering", in AccessScience@McGraw-Hill, http://www.accessscience.com, DOI 10.1036/1097-8542.546610.*
Official Office Action, Sep. 26, 2011.
Official Office Action, Oct. 20, 2011.
European Search Report; EP 08250846, Mar. 28, 2012.

* cited by examiner

*Primary Examiner* — Prem C Singh
*Assistant Examiner* — Michelle Stein
(74) *Attorney, Agent, or Firm* — Orrick, Herrington & Sutcliffe LLP

(57) ABSTRACT

The present invention is directed to the upgrading of heavy petroleum oils of high viscosity and low API gravity that are typically not suitable for pipelining without the use of diluents. The method comprises introducing a particulate heat carrier into an up-flow reactor, introducing the feedstock at a location above the entry of the particulate heat carrier, allowing the heavy hydrocarbon feedstock to interact with the heat carrier for a short time, separating the vapors of the product stream from the particulate heat carrier and liquid and byproduct solid matter, collecting a gaseous and liquid product mixture comprising a mixture of a light fraction and a heavy fraction from the product stream, and using a vacuum tower to separate the light fraction as a substantially bottomless product and the heavy fraction from the product mixture.

12 Claims, 7 Drawing Sheets

METHODS AND SYSTEMS FOR PRODUCING REDUCED RESID AND BOTTOMLESS PRODUCTS FROM HEAVY HYDROCARBON FEEDSTOCKS

FIELD OF INVENTION

The present invention relates to rapid thermal processing (RTP™) of a viscous crude feedstock to produce an upgraded product. More specifically, this invention relates to an upgrading process and apparatus for producing a low resid and/or bottomless liquid product from a heavy hydrocarbon feedstock.

BACKGROUND OF THE INVENTION

Heavy oil and bitumen resources are supplementing the decline in the production of conventional light and medium crude oils, and production from these resources is steadily increasing. Pipelines cannot handle these crude oils unless diluents are added to decrease their viscosity and specific gravity to pipeline specifications. Alternatively, desirable properties are achieved by primary upgrading. However, diluted crudes or upgraded synthetic crudes are significantly different from conventional crude oils. As a result, bitumen blends or synthetic crudes are not easily processed in conventional fluid catalytic cracking refineries. Therefore, in either case further processing must be done in refineries configured to handle either diluted or upgraded feedstocks.

Many heavy hydrocarbon feedstocks are also characterized as comprising significant amounts of BS&W (bottom sediment and water). Such feedstocks are not suitable for transportation by pipeline, or refining due to their corrosive properties and the presence of sand and water. Typically, feedstocks characterized as having less than 0.5 wt. % BS&W are transportable by pipeline, and those comprising greater amounts of BS&W require some degree of processing or treatment to reduce the BS&W content prior to transport. Such processing may include storage to let the water and particulates settle, and heat treatment to drive off water and other components. However, these manipulations add to operating cost. There is therefore a need within the art for an efficient method of upgrading feedstock having a significant BS&W content prior to transport or further processing of the feedstock.

Heavy oils and bitumens can be upgraded using a range of processes including thermal, hydrocracking, visbreaking, or catalytic cracking procedures. Several of these processes, such as visbreaking or catalytic cracking, utilize either inert or catalytic particulate contact materials within upflow or downflow reactors. Catalytic contact materials are for the most part zeolite based, while visbreaking typically utilizes inert contact material, carbonaceous solids, or inert kaolin solids.

The use of fluid catalytic cracking (FCC), or other units for the direct processing of bitumen feedstocks is known in the art. However, many compounds present within the crude feedstocks interfere with these processes by depositing on the contact material itself. These feedstock contaminants include metals such as vanadium and nickel, coke precursors such as (Conradson) carbon residues, and asphaltenes. Unless removed by combustion in a regenerator, deposits of these materials can result in poisoning and the need for premature replacement of the contact material. This is especially true for contact material employed with FCC processes, as efficient cracking and proper temperature control of the process requires contact materials comprising little or no combustible deposit materials or metals that interfere with the catalytic process.

To reduce contamination of the catalytic material within catalytic cracking units, pretreatment of the feedstock via visbreaking, thermal or other processes, typically using FCC-like reactors, operating at temperatures below that required for cracking the feedstock have been suggested. These systems operate in series with FCC units and function as pretreaters for FCC. These pretreatment processes are designed to remove contaminant materials from the feedstock, and operate under conditions that mitigate any cracking. These processes ensure that any upgrading and controlled cracking of the feedstock takes place within the FCC reactor under optimal conditions.

Several of these processes have been specifically adapted to process "resids" (i.e. feedstocks produced from the fractional distillation of a whole crude oil) and bottom fractions, in order to optimize recovery from the initial feedstock supply. The disclosed processes for the recovery of resids, or bottom fractions, are physical and involve selective vaporization or fractional distillation of the feedstock with minimal or no chemical change of the feedstock. These processes are also combined with metal removal and provide feedstocks suitable for FCC processing. The selective vaporization of the resid takes place under non-cracking conditions, without any reduction in the viscosity of the feedstock components, and ensures that cracking occurs within an FCC reactor under controlled conditions. None of these approaches disclose the upgrading of feedstock within this pretreatment (i.e. metals and coke removal) process. Other processes for the thermal treatment of feedstocks involve hydrogen addition (hydrotreating), which results in some chemical change in the feedstock.

Methods are known for assisting in the recovery of heavy oils from oil production fields. For example, one method used for removing bitumen from oil-sands is an oil extraction process known as Steam-Assisted Gravity Drainage (SAGD). SAGD uses steam generated from a source of energy, such as natural gas, to reduce the viscosity of the solidified bitumen and make it transportable through a pipeline. This method requires the introduction of natural gas to the oil field. Furthermore, the amount of natural gas needed to extract a barrel of bitumen from oil sands in energy equivalents is about 1 to 1.25 GJ. Due to fluctuations in the price of natural gas, the cost of obtaining a barrel of bitumen using SAGD and natural gas may escalate over time. It is therefore desirable to have an alternate source of energy for generating steam that is inexpensive, replenishable and in close proximity to the site of a bitumen production facility to control the cost of operations and allow the facility to operate with little or no natural gas.

The present invention is directed to a method for upgrading heavy hydrocarbon feedstocks, for example but not limited to heavy oil or bitumen feedstocks, to produce a bottomless product or other upgraded product as desired based on market or consumer requirements or preferences. The method utilizes a short residence-time pyrolytic reactor operating under conditions that upgrade the feedstock and a vacuum tower. The feedstock used within this process may comprise significant levels of BS&W and still be effectively processed, thereby increasing the efficiency of feedstock handling. Furthermore, a portion or all of the energy requirement of the oil field may be addressed by removing some of the partially upgraded product, thereby reducing or eliminating the need for externally supplied natural gas.

SUMMARY OF THE INVENTION

The present invention relates to rapid thermal processing (RTP™) of a viscous crude feedstock to produce an upgraded product. More specifically, this invention relates to an upgrading process and apparatus for producing a bottomless liquid product or other desired upgraded product from a heavy hydrocarbon feedstock.

In one aspect, the present invention provides a method of producing a bottomless product or upgraded product from a heavy hydrocarbon feedstock, for example, a heavy oil or bitumen, comprising:

a) upgrading or thermally converting the heavy hydrocarbon feedstock by a method comprising:
  i) providing a particulate heat carrier into an upflow reactor;
  ii) introducing the heavy hydrocarbon feedstock into the upflow reactor at at least one location above that of the particulate heat carrier so that a loading ratio of the particulate heat carrier to the heavy hydrocarbon feedstock is from about 10:1 to about 200:1, wherein the upflow reactor is run at a temperature of from about 300° C. to about 700° C., and
  iii) allowing the heavy hydrocarbon feedstock to interact with the particulate heat carrier with a residence time of less than about 20 seconds, to produce a product mixture comprising a product stream and the particulate heat carrier;
b) separating the product stream and the particulate heat carrier; and
c) obtaining a bottomless or upgraded product from the product stream using a vacuum tower.

Prior to step a)i), a pre-upgrading separation step can be added to separate light portions of the feedstock from heavy portions. This process results in a first light portion and a first heavy portion. The first heavy portion of the feedstock can then be used as the feedstock for step a)ii). The first light portion can be later combined with the bottomless or upgraded product obtained in step (c) as desired. Prior to the step of separating (step b), a mixture comprising the product stream and the particulate heat carrier may be removed from the reactor. Furthermore, after the step of separating (step b), a gaseous product and a liquid product, the liquid product comprising a light fraction and a heavy fraction, may be collected from the product stream. The particulate heat carrier, after the step of separating (step b), may be regenerated in a reheater to form a regenerated particulate heat carrier, and the regenerated particulate heat carrier may be recycled to the upflow reactor.

The present invention also pertains to the above-defined method, which further comprises:
  determining the energy requirements of an oil production facility, and based on the determined energy requirements of the consumer or the market demands of the upgraded product, either:
    i) transporting all of the heavy fraction of the product stream to the oil production facility for conversion into a form of energy,
    ii) transporting a fraction of the heavy fraction of the product stream to the oil production facility for conversion into a form of energy and recycling a remaining fraction of the heavy fraction to the upflow reactor for further processing within a recycle pyrolysis run to produce a recycle product stream, or
    iii) recycling all of the heavy fraction of the product stream to the upflow reactor for further processing within a recycle pyrolysis run to produce a recycle product stream.

Alternatively, following determining the energy requirements of an oil production facility, either:

i') converting all of the heavy fraction of the product stream into a form of energy and transporting the energy to the oil production facility,
  ii') converting a fraction of the heavy fraction of the product stream into a form of energy and transporting the energy to the oil production facility and recycling a remaining fraction of the heavy fraction to the upflow reactor for further processing within a recycle pyrolysis run to produce a recycle product stream, or
  iii') recycling all of the heavy fraction of the product stream to the upflow reactor for further processing within a recycle pyrolysis run to produce a recycle product stream.

The present invention also relates to the above-defined methods, wherein the further processing (within a recycle pyrolysis run to produce a recycle product stream) includes mixing the heavy fraction with the particulate heat carrier, wherein the particulate heat carrier of the recycle pyrolysis run is at a temperature at about, or above, that used in the first pyrolysis run (step of upgrading). For example, the temperature of the upflow reactor within the first pyrolysis run (step of upgrading) is from about 300° C. to about 590° C., and the temperature of the upflow reactor within the recycle pyrolysis run is from about 430° C. to about 700° C., and wherein the residence time of the recycle pyrolysis run is the same as, or longer than, the residence time of the first pyrolysis run (step of upgrading). In another example, the second step of rapid thermal processing (recycle run) comprises allowing the heavy fraction to interact with the particulate heat carrier in the reactor for preferably from about 0.01 to about 20 seconds, more preferably from about 0.1 to about 5 seconds, most preferably, from about 0.5 to about 3 seconds, wherein the ratio of the particulate heat carrier to the heavy hydrocarbon feedstock is from about 10:1 to about 200:1 to produce the recycle product stream. In a further example, the particulate heat carrier within the recycle pyrolysis run is separated from the recycle product stream, and a recycle liquid product mixture comprising a recycle light fraction is collected from the recycle product stream.

The present invention also pertains to the methods describe above, wherein the product stream is treated within a hot condenser prior to recovery of the light fraction and the heavy fraction.

In a further example of the above-defined methods, the upflow reactor is operated at a temperature in the range from about 450° C. to about 600° C., from about 480° C. to about 590° C., from about 480° C. to about 550° C., or from about 530° C. to about 620° C. In addition, in the step of introducing (step a)ii)), the loading ratio is from about 10:1 to about 200:1, and more preferably from about 10:1 to about 30:1.

In other examples of the above-described methods, the reheater is run at a temperature in the range from about 600° C. to about 900° C., from about 600° C. to about 815° C., or from about 700° C. to about 800° C.

The present invention also pertains to the above-defined methods, wherein prior to the step of upgrading, the feedstock is introduced into a pre-upgrading separation step that separates a light portion from a heavy component of the feedstock, and the heavy component is subjected to rapid thermal processing. In a preferred embodiment, the light component from the pre-upgrading separation step can be combined with the light fraction derived from a post-upgrading separation step (e.g. in a vacuum tower) to produce a bottomless and/or upgraded product that meets the requirements of the market or consumer.

The vacuum tower (or vacuum distillation tower) used as the post-upgrading separation step in the above-defined methods differs from an atmospheric fractionation system or other atmospheric/condensing collection vessel in that it functions under vacuum at high temperatures, to separate and remove a resid (or vacuum resid) component from a relatively lighter liquid component. The vacuum tower is advantageous in that it is effective at obtaining a narrower cut of the resid component thereby increasing the yield of lighter, more valuable liquid components obtained from the upgrading step. This allows for the creation of an end product that is easier to transport. Creation of a bottomless product or very low resid product has the added benefit of allowing the end product to be sent to a refinery that does not have a coker or other resid handling capabilities. In a further embodiment, one or more of the light portions can be used as a quenching agent in the upgrading system.

In addition, the product produced can be tailored to the needs of the market or consumer. For example, the quality of the end product can be adjusted by altering the number of passes through the system. In a first embodiment, a pre-upgrading separation step creates a first light portion and a first heavy portion. The first heavy portion can then be used as the heavy hydrocarbon feedstock, which is then upgraded. The upgrading process creates a top and bottom product, wherein the top product generally has a boiling point of less than 350-400° C. and the bottom product generally has a boiling point above 350-400° C. The bottom product can be processed in a post-upgrading separation step to produce a second light portion and a second heavy portion. The second light portion can be combined with the first light portion to produce to a highly upgraded and/or bottomless product with a very low resid percentage. The second heavy product can be re-processed through the system, or as detailed further herein, the heavy product can be used to generate energy for the system and/or facility. In a further preferred embodiment, a portion of the top product obtained from the fractionator is fed through a transfer line to act as a quenching agent. The point of entry of the quenching agent can be in between the hot section and the fractionator or at other points within the system.

Preferably, the bottom product can be sent to one of three pathways, each of which provide varying levels of recycling of the heavy product. The first pathway is to feed the bottom product back into the system at the feedstock entry point. A second pathway is to process the bottom portion in a post-upgrading separation step, which like the process described above separates the input (in this case the bottom portion) into a light fraction and a heavy fraction. The third pathway is to combine the bottom product with the initial crude product in the pre-separation process, which then creates a light portion and a heavy portion, wherein the heavy portion can then be used as or as a supplement to the feedstock. By modifying the process within these alternative embodiments and pathways, the end upgraded or bottomless product can be tailored based on the preferences of the market and consumer. For example to convert more the feedstock to a product, a recycling process can be utilized rather than a single pass process.

All or a fraction of the product stream or the resid may be converted into a form of energy (e.g. steam) for use by an oil production facility thereby allowing the process to be modified or tailored to meet the energy needs of the specific facility. Any of the product stream or the resid that is not converted into a form of energy may be recycled by a further upgrading step involving rapid thermal processing to produce a further product mixture that can be separated using the post-upgrading separation step into a further amount of the bottomless light oil fraction. The method of the present invention is advantageous in that it can adjust the amount of product stream or resid material that is submitted for recycling based on the energy requirements of an oil production facility. Based on the energy requirements of the oil production facility, the amount of the product stream or the resid that is submitted for recycling may be increased or decreased relative to a preexisting level of recycling. In particular, if the oil production facility does not require any external source of energy, then all or most of the product stream or the resid may be recycled. Conversely, if the oil production facility requires a large amount of external energy to support its operation, then a larger portion the product stream or the resid material may be transported to the oil production facility for conversion into energy, or be directly converted into a form of energy, which is subsequently conducted to the facility. In addition, the facility preferably is able to obtain additional energy in the form of captured sensible heat due to the close proximity of the conversion unit to the energy consumer.

In a further example, the methods described above may further comprise isolating a VGO from the light fraction.

The present invention also relates to the method as defined above, wherein the temperature of the upflow reactor is less than 750° C., wherein the residence time is preferably from about 0.01 to about 20 seconds, more preferably from about 0.1 to about 5 seconds, most preferably, from about 0.5 to about 3 seconds, and wherein the particulate heat carrier is silica sand.

This invention is also directed to the above method wherein the contaminants, including Conradson carbon (coke), BS&W, nickel and vanadium are removed or reduced from the feedstock or deposited onto the heat carrier, or captured in the spent flue gas conditioning system.

In another aspect, the present invention provides a system comprising,
 i) an upflow reactor comprising:
  a) at least one injector at least one of the plurality of locations along said upflow reactor, for introducing said heavy hydrocarbon feedstock into the upflow reactor,
  b) a particulate heat carrier, the particulate heat carrier present at a loading ratio of about 10:1 to about 200:1, or, more particularly from 10:1 to 30:1, with respect to the heavy hydrocarbon feedstock;
  c) an inlet for introducing the particulate heat carrier, the inlet located below the at least one injection means,
  d) a conversion section within the upflow reactor; and
 ii) a vacuum tower.
The systems may further comprise,
 a) a pre-heater for pre-heating the heavy hydrocarbon feedstock;
 b) a separator at an outlet of the upflow reactor to separate gaseous and liquid products from the particulate heat carrier;
 c) a particulate heat carrier regenerator, or reheater;
 d) a particulate heat carrier recirculation line from the regeneration means to the reactor inlet for supplying the particulate heat carrier to the mixing section; and
 e) a condensing element for cooling, condensing, and collecting the liquid products;
 f) further collection means such as demisters, filters and knock-out vessels; or
 g) a recycle gas means to supply transport media to the upflow reactor The present invention also relates to the above-defined system, wherein the system and methods can be configured and modified based on the energy requirements of the oil production facility.

The present invention also relates to the above-defined system, which further comprises a hot condensing element prior to the condensing element, and, optionally, a heavy fraction product recirculator from the hot condensing element to the at least one injector of the upflow reactor.

The present invention also pertains to the system defined above, wherein the plurality of locations includes locations distributed along the length of said reactor.

The resid fraction or a portion of the product stream, produced according to the present invention may advantageously be used to supply the energy needs of an on- or off-site oil production facility, and, therefore, either partially or completely eliminate the need for other more costly sources of energy, such as natural gas, thereby controlling the cost of oil extraction. For example, the resid fraction, or a portion of the product stream, may be obtained according to the present invention and may be used to partially or completely replace natural gas as a source of energy for generating steam for use in the oil extraction process for example, Steam-Assisted Gravity Drainage (SAGD). The resid fraction, or a portion of the product stream, obtained as defined herein can therefore act as an inexpensive, alternate source of energy, which is produced on-site. This may result in reduced costs of operations. Furthermore, the ability to use energy produced from the by-product stream allows for the system to be tailored to the energy needs of the particular site or facility.

As noted in more detail below, by processing a heavy hydrocarbon feedstock using rapid thermal processing in combination with a post-upgrading separation step (e.g. via a vacuum tower), a higher yield of bottomless product may be obtained. The use of the vacuum tower permits obtaining a narrower cut of the resid component than is achievable with an atmospheric fractionation column alone. This results in an increased yield of lighter, more valuable liquid components obtained from the upgrading step. To further increase gas oil yields the vacuum tower may be operated in a deep cut mode in which higher cutpoints are implemented. Furthermore, by coupling the processing of the heavy hydrocarbon feedstock using rapid thermal processing and a vacuum tower, the system may be used on site at an oil production facility and the product produced can be tailored to the requirements of the market or consumer. Advantageously, using the system of the present invention, all or part of the energy requirement of the oil production facility may be derived from the liquid product stream or resid produced during the processing of the heavy hydrocarbon feedstock.

BRIEF DESCRIPTION OF THE DRAWINGS

The present invention relates to rapid thermal processing (RTP™) of a viscous crude feedstock to produce an upgraded product. More specifically, this invention relates to an upgrading process and apparatus for producing a substantially bottomless liquid product or other desired upgraded from a heavy hydrocarbon feedstock.

It should be noted that elements of similar structures or functions are generally represented by like reference numerals for illustrative purpose throughout the figures. It should also be noted that the figures are only intended to facilitate the description of the preferred embodiments.

DESCRIPTION OF PREFERRED EMBODIMENT

Figure 1:
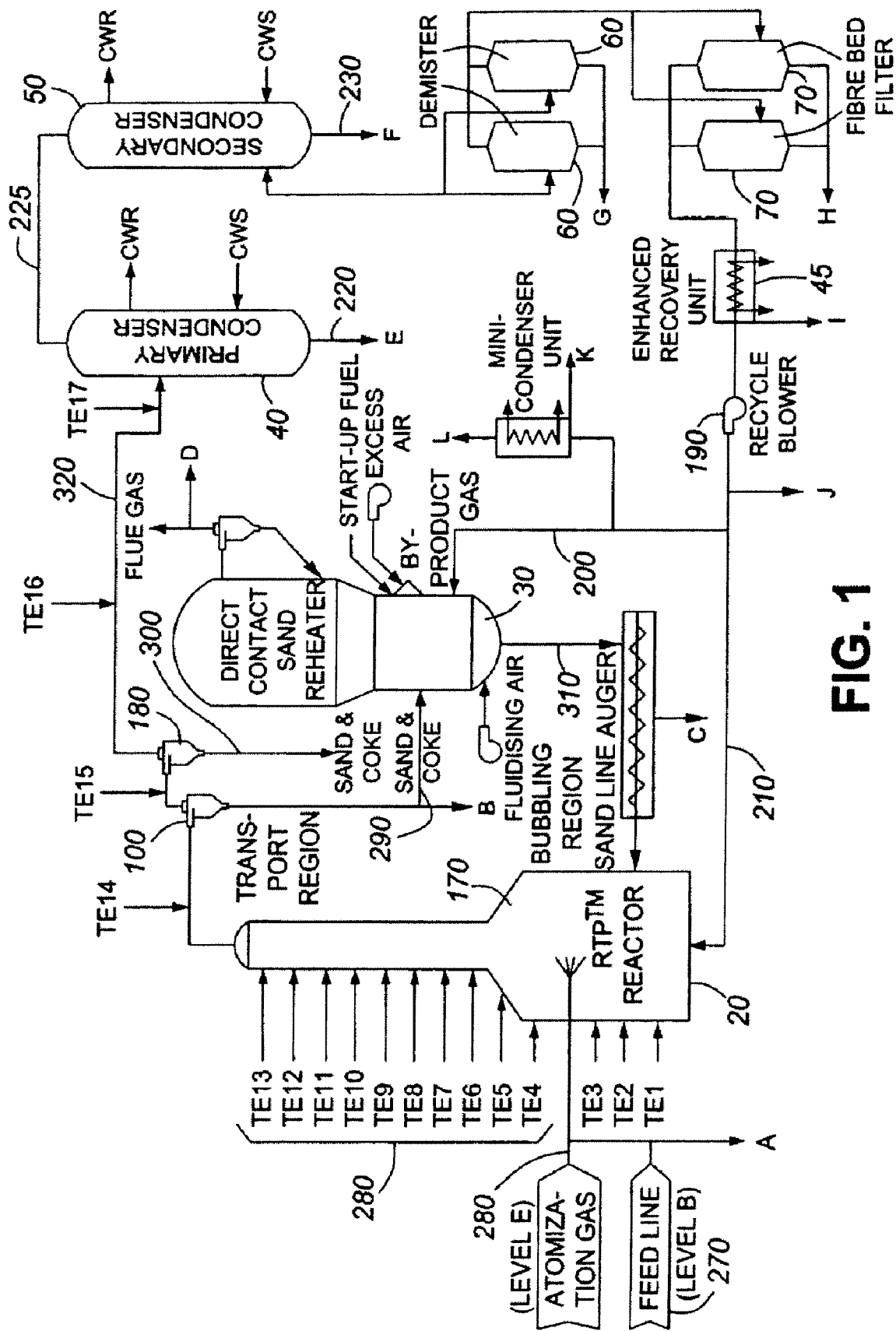
FIG. 1 is a schematic drawing of an example of an embodiment of the present invention relating to a system for the pyrolytic processing of feedstocks. Lines A-D, and I-L indicate optional sampling ports.

The present invention relates to rapid thermal processing (RTP™) of a viscous crude feedstock to produce an upgraded product. More specifically, this invention relates to an upgrading process and apparatus for producing a substantially bottomless liquid product or other desired upgraded product from a heavy hydrocarbon feedstock.

The following description is of a preferred embodiment by way of example only and without limitation to the combination of features necessary for carrying the invention into effect.

The present invention provides a method of producing a bottomless product and/or upgraded product that meets the requirements of the market or customer from a heavy hydrocarbon feedstock, for example, a heavy oil or bitumen, comprising:

a) upgrading a heavy hydrocarbon feedstock by a method comprising:
  i) providing a particulate heat carrier into an upflow reactor;
  ii) introducing the heavy hydrocarbon feedstock into the upflow reactor at at least one location above that of the particulate heat carrier so that a loading ratio of the particulate heat carrier to the heavy hydrocarbon feedstock is from about 10:1 to about 200:1, wherein the upflow reactor is run at a temperature of from about 300° C. to about 700° C., and
  iii) allowing the heavy hydrocarbon feedstock to interact with the heat carrier with a residence time of less than about 20 seconds, to produce a product stream;
b) separating the product stream and the particulate heat carrier from the mixture; and
c) obtaining a bottomless product or upgraded product from the product stream using a post-upgrading separation step using, for example, a vacuum tower.

Prior to step a)i), a pre-upgrading separation step can be added to separate light portions of the feedstock from heavy portions. This process results in a first light portion and a first heavy portion. The first heavy portion of the feedstock can then be used as the feedstock for step a)ii). The first light portion can be later combined with the bottomless or upgraded product obtained in step (c) as desired. Prior to the step of separating (step b), a mixture comprising the product stream and the particulate heat carrier may be removed from the reactor. Furthermore, after the step of separating (step b), a gaseous product and a liquid product mixture of a light fraction and a heavy fraction may be collected from the product stream by cooling and condensing the product stream. In a further embodiment, a portion of the light fraction can be recirculated and used as a quenching material. The particulate heat carrier, after the step of separating (step b), may be regenerated in a reheater to form a regenerated particulate heat carrier, and the regenerated particulate heat carrier may be recycled to the upflow reactor.

By "bottomless" light fraction or a "bottomless product", it is meant a light oil fraction which contains less than 7-8%, more particularly less than 5%, even more particularly less than 1% of a heavy (vacuum) resid component present in a product stream derived from rapid thermal processing.

By "feedstock" or "heavy hydrocarbon feedstock", it is generally meant a petroleum-derived oil of high density and viscosity often referred to (but not limited to) heavy crude, heavy oil, bitumen (including both natural and semi-solid forms and manufactured bitumens) or a refinery resid (oil or asphalt). However, the term "feedstock" may also include the bottom fractions of petroleum crude oils, such as atmospheric tower bottoms or vacuum tower bottoms. It may also include oils derived from coal and shale. Furthermore, the feedstock may comprise significant amounts of BS&W (Bottom Sediment and Water), for example, but not limited to, a BS&W content of greater than 0.5 wt %. Heavy oil and bitumen are preferred feedstocks.

For the purpose of application the feedstocks may be characterized as having
i) high TAN, low sulfur content,
ii) low TAN, high sulfur content,
iii) high TAN, high sulfur content, or
iv) low TAN, low sulfur content.

These heavy oil and bitumen feedstocks are typically viscous and difficult to transport. Bitumens typically comprise a large proportion of complex polynuclear hydrocarbon asphaltenes that add to the viscosity of this feedstock and some form of pretreatment of this feedstock is required for transport. Such pretreatment typically includes dilution in solvents prior to transport.

Typically tar-sand derived feedstocks (see Example 1 for an analysis of examples, which are not to be considered limiting, of such feedstocks) are pre-processed prior to upgrading, as described herein, in order to concentrate bitumen. However, pre-processing of oil sand bitumen may involve methods known within the art, including hot or cold water treatments, or solvent extraction that produces a bitumen gas-oil solution. These pre-processing treatments typically separate bitumen from the sand. For example, one such water pre-processing treatment involves the formation of a tar-sand containing bitumen-hot water/NaOH slurry, from which the sand is permitted to settle, and more hot water is added to the floating bitumen to dilute out the base and ensure the removal of sand. Cold water processing involves crushing oil sand in water and floating it in fuel oil, then diluting the bitumen with solvent and separating the bitumen from the sand-water residue. Such bitumen products are candidate feedstocks for further processing as described herein.

Bitumens may be upgraded using the process of this invention, or other processes such as FCC, viscracking, hydrocracking etc. Pre-treatment of tar sand feedstocks may also include hot or cold water treatments, for example, to partially remove the sand component prior to upgrading the feedstock using the process as described herein, or other upgrading processes including dewaxing (using rapid thermal processing as described herein), FCC, hydrocracking, coking, visbreaking etc. Therefore, it is to be understood that the term "feedstock" also includes pre-treated feedstocks, including, but not limited to those prepared as described above.

Lighter feedstocks may also be processed following the method of the invention as described herein. For example, and as described in more detail below, liquid products obtained from a first pyrolytic treatment as described herein, may be further processed by the method of this invention (for example recycle and partial recycle processing; see FIG. 5 and Examples 3 and 4) to obtain a liquid product characterized as having reduced viscosity, a reduced metal (especially nickel, vanadium) and water content, and a greater API gravity. Furthermore, liquid products obtained from other processes as known in the art may also be used as feedstocks for the process described herein. Therefore, the present invention also contemplates the use of lighter feedstocks including gas oils, vacuum gas oils, topped crudes or pre-processed liquid products, obtained from heavy oils or bitumens. These lighter feedstocks may be treated using the process of the present invention in order to upgrade these feedstocks for further processing using, for example, but not limited to, FCC, hydrocracking, etc.

The liquid product arising from the process as described herein may be suitable for transport within a pipeline to permit its further processing elsewhere, or processed on-site using a vacuum tower to obtain a bottomless product and/or upgraded product. The product produced using the present method may also be directly inputted into a unit capable of further upgrading the feedstock, such as, but not limited to coking, visbreaking, or hydrocracking. In this capacity, the pyrolytic reactor coupled with the vacuum tower of the present invention partially upgrades the feedstock while acting as a pre-treater of the feedstock for further processing. In addition, the bottomless product that can be produced using the methods and systems described herein has the further advantage that it can be more easily transported via a pipeline and be processed at a refinery lacking a coker.

The feedstocks of the present invention are processed using a fast pyrolysis reactor. Other known riser reactors with short residence times may also be employed. The reactor may also be run at a temperature of from about 450° C. to about 600° C., or from about 480° C. to about 550° C. The contact times between the heat carrier and feedstock is preferably from about 0.01 to about 20 seconds, more preferably from about 0.1 to about 5 seconds, most preferably, from about 0.5 to about 3 seconds.

A heat carrier may be a particulate solid, preferably sand, for example, silica sand. By silica sand it is meant any sand comprising greater than about 80% silica, preferably greater than about 95% silica, and more preferably greater than about 99% silica. It is to be understood that the above composition is an example of a silica sand that can be used as a heat carrier as described herein, however, variations within the proportions of these ingredients within other silica sands may exist and still be suitable for use as a heat carrier. Other known particulate heat carriers or contact materials, for example kaolin clays, zirconium, rutile, low surface area alumina, oxides of magnesium and calcium may also be used.

Any water present in the feedstock vaporises in the reactor during pyrolysis of the feedstock, and forms part of the product stream. This water along with any steam used for feedstock atomization may be recovered by using a recovery unit such as a liquid/vapour separator or a refrigeration unit present, for example, at a location downstream of the condensing columns (for example, condensers 40 and 50 of FIG. 1) and before the demisters (for example, demisters 60 of FIG. 1), or at an enhanced recovery unit (45; FIG. 1), after the demisters.

Processing of feedstocks using fast pyrolysis results in the production of product vapours and solid byproducts associated with the heat carrier. After separating the heat carrier from the product mixture, the product vapours may be condensed to obtain a liquid product stream and gaseous by-products. For example, which is not to be considered limiting, the liquid product produced from the processing of heavy oil, and prior to any separation, for example using a vacuum tower, as described herein, is characterized in having the following properties:

- a final boiling point of less than about 660° C., preferably less than about 600° C., and more preferably less than about 540° C.;
- an API gravity of at least about 12, and preferably greater than about 17 (where API gravity=[141.5/specific gravity]−131.5; the higher the API gravity, the lighter the material);
- greatly reduced metals content, including V and Ni;
- greatly reduced viscosity levels (more than 25 fold lower than that of the preferred feedstock, for example, as determined @ 40° C.), and
- yields of liquid product of at least 60 vol %, preferably the yields are greater than about 70 vol %, and more preferably they are greater than about 80%.

Following the methods as described herein, a liquid product obtained from processing bitumen feedstock, and prior to any separation, which is not to be considered limiting, is characterized as having:

- an API gravity from about 8 to about 25;
- greatly reduced metals content, including V and Ni;
- a greatly reduced viscosity of more than 20 fold lower than the feedstock (for example as determined at 40° C.), and
- yields of liquid product of at least 60 vol %, preferably the yields are greater than about 75 vol %.

The liquid products described above are then processed using a post-upgrading separation step (for example using a vacuum tower) to obtain an upgraded product with a reduced resid content and/or a bottomless product depending on the preferences of the market and consumer.

A first method for upgrading a feedstock to obtain liquid products from which an upgraded, lower resid product and/or bottomless product may be obtained using a vacuum tower, involves a single pass process. With reference to FIG. 1, briefly, the fast pyrolysis system includes a feed system generally indicated as (10; also see FIGS. 2 and 3), that injects the feedstock into a reactor (20), a heat carrier separation system that separates the heat carrier from the product vapour (e.g. 100 and 180, FIG. 1) and recycles the heat carrier to the reheating/regenerating system (30), a particulate inorganic heat carrier reheating system (30) that reheats and regenerates the heat carrier, and primary (40) and secondary (50) condensers that collect the product. Alternatively, a fractionation column, for example but not limited to an atmospheric fractionation column (discussed in more detail below), may be used in place of separate condensers to collect the product from vapour. In addition, more than one fractionation column may be used to process the feedstock. In another example, a vacuum tower may be used alone or in conjunction with a fractionation separation step or primary and secondary condensers or other collection system to collect the product from the vapour, and then used to separate a bottomless light fraction and a heavy fraction (e.g. resid) from the product. The end product produced can be varied depending on the preferences of the market and/or consumer. For example, an end product with a lower resid percentage can be generated by a process which employs a greater degree of recycling during the upgrading process. Thus, a single pass process will typically generate an end product with a higher resid percentage than if a recycling or partially recycling process is used.

Preferably, prior to the upgrading process, the initial feedstock or crude is processed in a pre-upgrading separation step. This pre-upgrading separation step creates a first light fraction and a first heavy fraction. As discussed further below, the first light fraction can be added to the light product produced during fractionation to create a bottomless or very low resid product. The first heavy portion can be used as the feedstock for the upgrading process.

Figure 2:
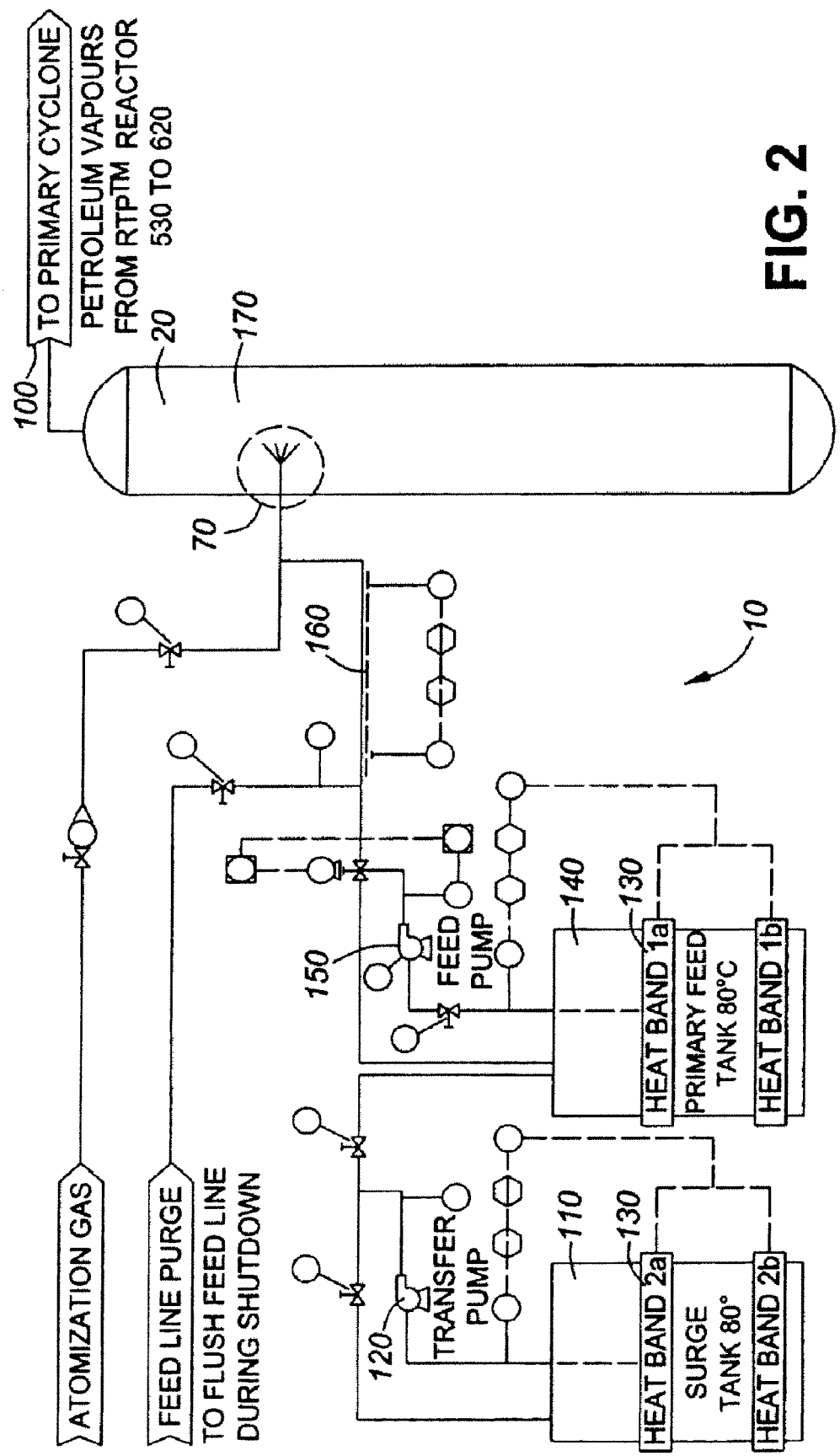
FIG. 2 is a schematic drawing of an example of an embodiment of the present invention relating to the feed system for introducing the feedstock to the system for the pyrolytic processing of feedstocks.

The pre-heated feedstock enters the reactor below the mixing zone (170) and is contacted by the upward flowing stream of hot carrier within a transport fluid, that typically is a recycle gas supplied by a recycle gas line (210). The feedstock may be obtained after passage through a fractionation column, where a gaseous component of the feedstock is removed, and the non-volatile component is transported to the reactor for further processing. Rapid mixing and conductive heat transfer from the heat carrier to the feedstock takes place in the short residence time conversion section of the reactor. The feedstock may enter the reactor through at least one of several locations along the length of the reactor. The different entry points indicated in FIGS. 1 and 2 are non-limiting examples of such entry locations. By providing several entry points along the length of the reactor, the length of the residence time within the reactor may be varied. For example, for longer residence times, the feedstock enters the reactor at a location lower down the reactor, while, for shorter residence times, the feedstock enters the reactor at a location higher up the reactor. In all of these cases, the introduced feedstock mixes with the upflowing heat carrier within a mixing zone (170) of the reactor. The product vapours produced during pyrolysis are cooled and collected using a suitable condenser means (40, 50, FIG. 1) and/or a fractionation column, to obtain a liquid product. In a preferred embodiment, a vacuum tower may be used alone or in conjunction with primary and secondary condensers and/or a fractionation separation step to collect the product from the vapour, and then used to separate a substantially bottomless light fraction and a heavy fraction (e.g. resid) from the product as described in further detail above. Use of a vacuum tower has the advantage of being better able to separate the light portions of the vapours from the heavy portion, thereby leading to a product with a lower resid percentage. In a further embodiment, the light liquid fraction can be used as a quenching material. The use of the light liquid fraction has the advantage that since it is composed of a low or resid-free fractions, there is a lower propensity to form coke. Therefore, the use of lighter, lower resid materials as a quenching agent is preferable to agents having a higher resid percentage.

A bottom product can be collected and isolated using a condensing system and/or a fractionation separation step during pyrolysis and can be used to generate energy for the oil production facility as described herein. In a further embodiment, the bottom product, which generally boils at a temperature higher than 300-400° C., is recycled or partially recycled through the system using one of three pathways. In a first pathway, the bottom product can be used as the feedstock and/or added to the heavy feedstock and can be reprocessed through the hot system. In a second pathway, the bottom product can processed by a post-upgrading separation step to create a light cut and heavy cut. The light cut can be added to the other light fractions produced and/or be used as a quenching agent. The heavy cut can be used to generate energy and/or be further recycled. The third pathway for the bottom product is to process the bottom product in the pre-upgrading separation step, which creates a light cut and a heavy cut that can be further transferred/processed.

In a further embodiment, (FIG. 5), crude can be added to the internal upgrading fractionator or condensing system directly to provide an internal cut of a light portion and a heavy portion. The heavy or bottom portion can be directed to the upflow reactor, and/or the post upgrading fractionation system, and/or to an appropriate energy conversion system.

It is to be understood that other fast pyrolysis systems, comprising differences in reactor design, that utilize alternative heat carriers, heat carrier separators, different numbers or size of condensers, or different condensing means, may be used for the preparation of the upgraded product of this invention. The reactor is preferably run at a temperature of from about 450° C. to about 600° C., more preferably from about 480° C. to about 550° C.

Following pyrolysis of the feedstock in the presence of the heat carrier, coke containing contaminants present within the feedstock are deposited onto the heat carrier. These contaminants include metals (such as nickel and vanadium), nitrogen and sulfur. The heat carrier therefore requires regeneration before re-introduction into the reaction stream. The heat carrier is regenerated in the sand reheater or regenerator (30, FIGS. 1 and 5). The heat carrier may be regenerated via combustion within a fluidized bed of the sand reheater (30) at a temperature of about 600° C. to about 900° C., preferably from 600° C. to 815° C., more preferably from 700° C. to 800° C. Furthermore, as required, deposits may also be removed from the heat carrier by an acid treatment. The heated, regenerated, heat-carrier is then re-introduced to the reactor (20) and acts as heat carrier for fast pyrolysis.

Figure 5:
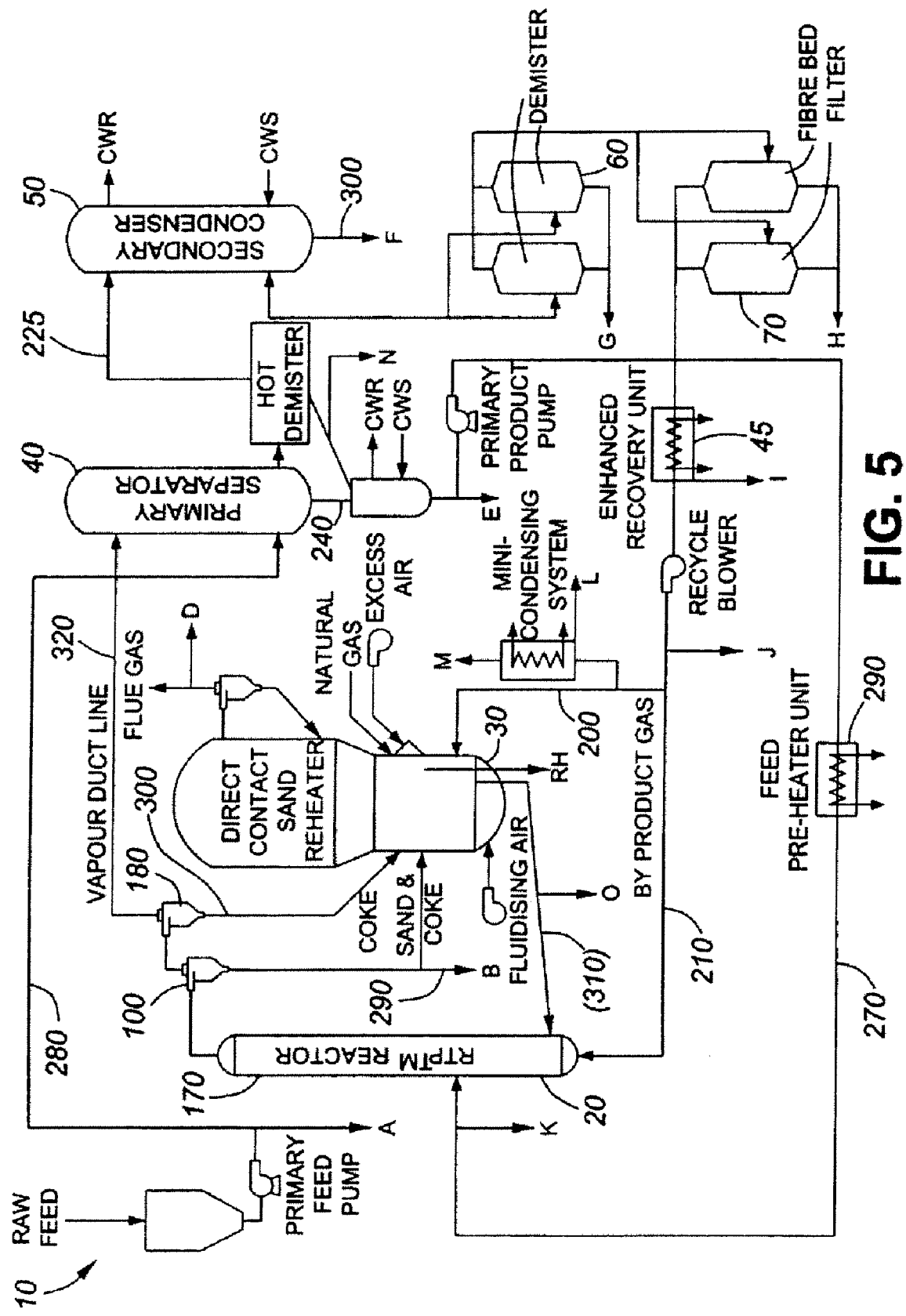
FIG. 5 is a schematic drawing of an example of an embodiment of the present invention relating to an internal fractionation for the pyrolytic processing of feedstocks. Lines A-E, and I-N indicate optional sampling ports.

The feed system (10, FIG. 2) provides a preheated feedstock to the reactor (20). An example of a feed system which is not to be considered limiting in any manner, is shown in FIG. 2, however, other embodiments of the feed system are within the scope of the present invention, for example but not limited to a feed pre-heater unit as shown in FIG. 5 (discussed below), and may be optionally used in conjunction with a feed system (10; FIG. 5). The feed system (generally shown as 10, FIG. 2) is designed to provide a regulated flow of pre-heated feedstock to the reactor unit (20). The feed system shown in FIG. 2 includes a feedstock pre-heating surge tank (110), heated using external band heaters (130) to 80° C., and is associated with a recirculation/transfer pump (120). The feedstock is constantly heated and mixed in this tank at 80° C. The hot feedstock is pumped from the surge tank to a primary feed tank (140), also heated using external band heaters (130), as required. However, it is to be understood that variations on the feed system may also be employed, in order to provide a heated feedstock to the reactor. The primary feed tank (140) may also be fitted with a recirculation/delivery pump (150). Heat traced transfer lines (160) are maintained at about 100-300° C. and pre-heat the feedstock prior to entry into the reactor via an injection nozzle (70, FIG. 2). Atomization at the injection nozzle (70) positioned near the mixing zone (170) within reactor (20) may be accomplished by any suitable means. The nozzle arrangement should provide for a homogeneous dispersed flow of material into the reactor. For example, which is not considered limiting in any manner, mechanical pressure using single-phase flow atomization, or a two-phase flow atomization nozzle may be used. With a two-phase flow atomization nozzle, steam or recycled by-product gas may be used as a carrier. Instrumentation is also dispersed throughout this system for precise feedback control (e.g. pressure transmitters, temperature sensors, DC controllers, 3-way valves gas flow meters etc.) of the system.

Conversion of the feedstock is initiated in the mixing zone (170; e.g. FIGS. 1 and 2) under moderate temperatures (typically less than 750° C., preferably from about 450° C. to about 600° C., more preferably from about 480° C. to about 550° C.) and continues through the conversion section within the reactor unit (20) and connections (e.g. piping, duct work) up until the primary separation system (e.g. 100) where the bulk of the heat carrier is removed from the product vapour stream. The solid heat carrier and solid coke by-product are removed from the product vapour stream in a primary separation unit. Preferably, the product vapour stream is separated from the heat carrier as quickly as possible after exiting from the reactor (20), so that the residence time of the product vapour stream in the presence of the heat carrier is as short as possible.

The primary separation unit may be any suitable solids separation device, for example but not limited to a cyclone separator, a U-Beam separator, or Rams Horn separator as are known within the art. A cyclone separator is shown diagrammatically in FIGS. 1, 3 and 4. The solids separator, for example a primary cyclone (100), is preferably fitted with a high-abrasion resistant liner. Any solids that avoid collection in the primary collection system are carried downstream and may be recovered in a secondary separation unit (180). The secondary separation unit may be the same as the primary separation unit, or it may comprise an alternate solids separation device, for example but not limited to a cyclone separator, a ¼ turn separator, for example a Rams Horn separator, or an impingement separator, as are known within the art. A secondary cyclone separator (180) is graphically represented in FIGS. 1 and 4, however, other separators may be used as a secondary separation unit.

The solids that have been removed in the primary and/or secondary collection systems are transferred to a vessel for regeneration of the heat carrier, for example, but not limited to a direct contact reheater system (30). In a direct contact reheater system (30), the coke and by-product gasses are oxidized to provide process thermal energy that is directly carried to the solid heat carrier (e.g. 310, FIGS. 1, 5), as well as regenerating the heat carrier. The temperature of the direct contact reheater is maintained independent of the feedstock conversion (reactor) system. However, as indicated above, other methods for the regeneration of the heat carrier may be employed, for example but not limited to acid treatment.

The hot product stream from the secondary separation unit may be quenched in a primary collection column (or primary condenser, 40; FIG. 1). The vapour stream is rapidly cooled from the conversion temperature to less than about 400° C. Preferably the vapour stream is cooled to less than about 350° C.-400° C. Product is drawn from the primary column and may be pumped (220) into product storage tanks, and/or recycled within the reactor as described below and/or directed to the pre-upgrading separation step and/or directed to the post-upgrading separation step, and/or directed to an appropriate conversion unit for energy recovery. A secondary condenser (50) can be used to collect any material (225) that evades the primary condenser (40). Product drawn from the secondary condenser (50) is also pumped (230) into product storage tanks and/or used as a quenching media as described below. The remaining non-condensable gas is compressed in a blower (190) and a portion is returned to the heat carrier regeneration system (30) via line (200), and the remaining gas is returned to the reactor (20) by line (210) and acts as a heat carrier, and transport medium.

The hot product stream may be quenched in the transfer line between the hot section and the fractionation or separation column and/or directly in the fractionation or separation column or in any column designed to provide different sections of liquid and a vapour overhead. A non-limiting example of a fractionation column is an atmospheric fractionation column, which provide three different sections for liquid recovery. However, fractionation columns comprising fewer or greater number of sections for liquid recovery may also be used.

The bottom section of the fractionation column can normally produce a liquid stream or bottoms product that is recycled back to the reactor through line 270. In a preferred embodiment, the bottom product is recycled or partially recycled through the system using one of three pathways. In a first pathway, the bottom product can be used as the feedstock and/or added to the heavy feedstock and be reprocessed through the hot system. In a second pathway, the bottom product can be processed by a post-upgrading separation step to create a light cut and heavy cut. The light cut can be added to the other light fractions produced and/or be used as a quenching agent. The heavy cut can be used to generate energy and/or be further recycled. The third pathway for the bottom product is to process the bottom product in the pre-upgrading separation step, which creates a light cut and a heavy cut that can be further transferred/processed. The selection of which the three pathways are used can be modified as desired based on the preferences of the market and consumer.

In another embodiment, the vapors from this bottom section, which are also termed volatile components, are sent to a middle section that can produce a stream that is cooled and sent to product storage tanks. The vapors, or volatile components, from the middle section are directed to the top section. The top section can produce a crude material that can be cooled and directed to product storage tanks, or used for quenching in the middle or top sections. Excess liquids present in this column are cooled and sent to product storage, and vapors from the top of the column can be further collected in downstream condensers, and/or demisters, and/or filters, and/or knockout drums. Non condensable gas is used for recycle gas needs. Cooled liquid from the top and/or middle section can be used as a vapour transfer line quenching media.

The fractionation column is typically run at or near atmospheric pressure. The fractionation column is generally configured to recover and collect the majority (i.e. >80%) of the liquid product produced by the rapid thermal processing step. 5-20% of the produced liquid product may, however, escape from the top of the fractionation column, but can be collected in one or more downstream collectors/condensers, demisters, and/or knockout vessels. In general, materials boiling at a temperature of about 300° C.-400° C. and above are collected in the bottom of the fractionation column and materials boiling below 300° C.-400° C. are collected in the top of the condenser and/or downstream collection devices. The materials collected at the bottom of the fractionation column may be directed to a downstream vacuum tower or to one of the three pathways discussed above.

In another example, the hot product vapours may be collected in one or more condensers, which are coupled with a vacuum tower, or an atmospheric fractionation column coupled with a vacuum tower, or may be collected in a vacuum tower alone. The vacuum tower can then be used to separate the product stream into a light fraction as a bottomless product and a heavy fraction (i.e. "resid" or "vacuum resid"; typically materials boiling above about 535° C.-565° C.).

In a further example, the raw feedstock is introduced into a fractionation column, prior to the step of upgrading (pre-fractionation), to separate a light liquid component of the feedstock and a heavy component. The heavy component derived from the raw feedstock is then subjected to the step of upgrading using rapid thermal processing. The hot product vapours derived from the upgrading step are then collected in one or more condensers, which are coupled with a vacuum tower, or an atmospheric fractionation column coupled with a vacuum tower, or collected in a vacuum tower alone. The vacuum tower can then be used to separate the product stream into a light fraction as a substantially bottomless product and a heavy fraction (i.e. "resid" or "vacuum resid") and the light component initially derived from the raw feedstock is combined with the light fraction derived from the vacuum tower following the step of upgrading.

The vacuum tower generally differs from other fractionation means in that heat must be added to a hydrocarbon stream and high temperatures under vacuum at high temperatures, to separate and remove a "resid" component ("vacuum resid") from a relatively lighter liquid component. Conversely, the fractionation column internally associated with the upgrading system functions as a cooler/condenser that removes heat from the product stream at essentially atmospheric pressure and intermediate temperatures. The vacuum tower provides an improved cut over the internal fractionating column or condensing system in that it operates under vacuum and can, therefore, effectively separate high boiling material (e.g. material having a boiling point of greater than 535° C.) from the desired lighter distillate products. The vacuum tower therefore enables the present system and methods to achieve a bottomless and/or very low resid product, wherein the resid percentage can be tailored to meet the requirements of the market or consumer. In general, to obtain more bottomless or lower resid product, greater single pass conversion is employed and/or during pyrolysis bottom material is recycled and/or partially recycled via one of three pathways as discussed herein. This will result in additional steps of separating light and heavy fractions, wherein the light fractions can be aggregated to form a composite end product having a resid percentage within a range desired by the market or consumer.

The resid fraction, or a portion of the product stream, produced according to the method of the present invention can act as a sole or supplementary source of energy for supplying the energy needs of an oil production facility. The resid fraction, or portion of the product stream, may therefore partially or completely eliminate the need for other more costly sources of energy, such as natural gas, which are needed in oil extraction processes, thereby advantageously controlling the cost of oil extraction. The resid fraction, or portion of the product stream, may be converted to a form of energy either on- or offsite of the oil production facility. The amount of energy required for an oil production facility may be regulated by market and consumer requirements. The methods of the present invention typically generate a useable amount of $CO_2$, such that in a further embodiment, the $CO_2$ generated can be used for enhanced oil recovery using methods known in the art.

The methods of the present invention is configured to determine the energy requirements of an oil production facility and based on the determined energy requirements, direct either:
  i) transportation of all of the heavy fraction of the product stream to the oil production facility (for conversion into a form of energy, such as steam or electricity),
  ii) transportation of a fraction of the heavy fraction of the product stream to the oil production facility for conversion into a form of energy (e.g. steam or electricity) and recycling a remaining fraction of the heavy fraction to the upflow reactor for further processing within a recycle pyrolysis run to produce a recycle product stream, or iii) recycling of all of the heavy fraction of the product stream to the upflow reactor for further processing within a recycle pyrolysis run to produce a recycle product stream.

Alternatively, based on the determined energy requirements, the method may direct either:

i) conversion of all of the heavy fraction of the product stream into a form of energy (e.g. such as steam or electricity) and transportation of the energy to the oil production facility, ii) conversion of a fraction of the heavy fraction of the product stream into a form of energy (e.g. such as steam or electricity), transportation of the energy to the oil production facility and recycling a remaining fraction of the heavy fraction to the upflow reactor for further processing within a recycle pyrolysis run to produce a recycle product stream, or iii) recycling of all of the heavy fraction of the product stream to the upflow reactor for further processing within a recycle pyrolysis run to produce a recycle product stream.

In addition to the resid fraction, further sources of energy produced by the method of the present invention, include, but are not limited to, coke produced by the upgrading of the heavy hydrocarbon feedstock or produced by recycling of product derived from the upgrading of the heavy hydrocarbon feedstock, by-product gas derived from the step of upgrading or heavy bottom material separated by a fractionation column or a condenser. All or a portion of these further sources of energy may also be converted to energy for use by an oil production facility depending on the needs of the facility, in addition, or independently of any energy produced from the resid fraction.

An amount of the heavy fraction of the product stream that is not allocated for energy production may be directed to the reheater for conversion to usable energy (e.g., steam and/or electricity).

In a further example, the raw feedstock is introduced into a pre-upgrading separation step, to separate a volatile component of the feedstock from a liquid mixture derived from the feedstock, which comprises a light component and a heavy component. The heavy component derived from the raw feedstock is then subjected to the step of upgrading using rapid thermal processing. The hot product vapours derived from the upgrading step are then collected in one or more condensers, which are coupled with a vacuum tower, or a fractionation column coupled with a vacuum tower, or collected in a vacuum tower alone. The vacuum tower can then be used to separate the product stream into a light fraction as a substantially bottomless product and a heavy fraction (i.e. "resid" or "vacuum resid") and the light component initially derived from the raw feedstock is combined with the light fraction derived from the vacuum tower following the step of upgrading.

Figure 6:
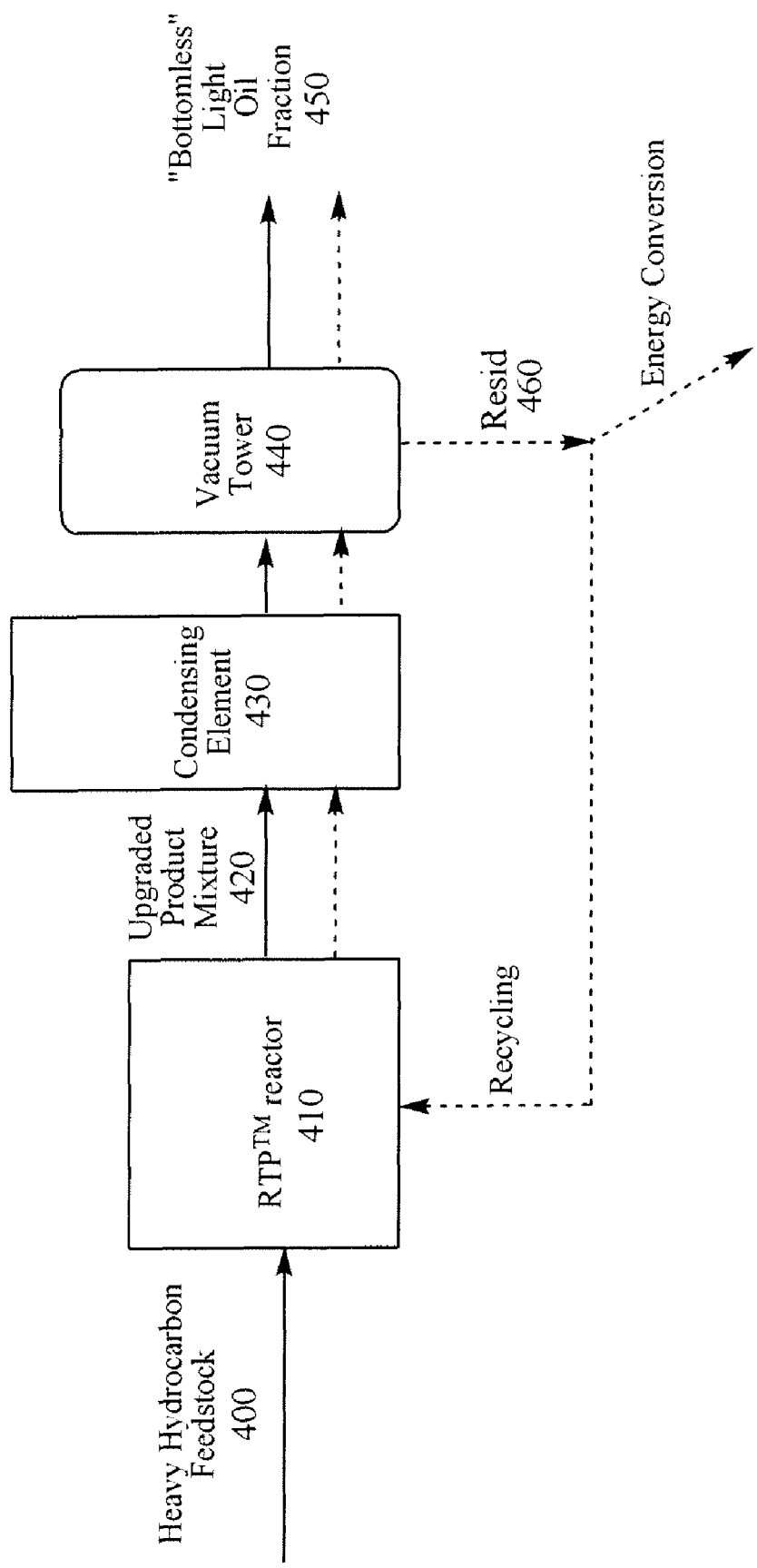
FIGS. 6-7 are schematics illustrating examples of processes according to the present invention of forming a bottomless light oil fraction from a heavy hydrocarbon feedstock and a resid product that may be recycled or used to generate energy for use by an oil production facility.

In a particular example illustrated in FIG. 6, a heavy hydrocarbon feedstock (400) is subjected to rapid thermal processing in an RTP™ reactor (410) according to the present invention to produce an upgraded product mixture (420), which is collected in one or more condensing elements (430), which are coupled with a vacuum tower (440). The vacuum tower (440) is then used to separate the upgraded product mixture (420) into a substantially bottomless light oil fraction (450) and a heavy fraction (460; "resid" or "vacuum resid"). All or a fraction of the resid (460) may be converted into a form of energy (e.g. steam) for use by an oil production facility.

Similarly, some or all of the product stream obtained after the condensing elements (430) may also be used for energy requirements within the oil producing facility. Any of the resid or product stream that is not converted into a form of energy may be recycled by rapid thermal processing to produce a further product mixture that can be separated using the vacuum tower (440) into a further amount of the bottomless light oil fraction and/or an upgraded product produced based on the requirements of the market and consumer.

Figure 7:
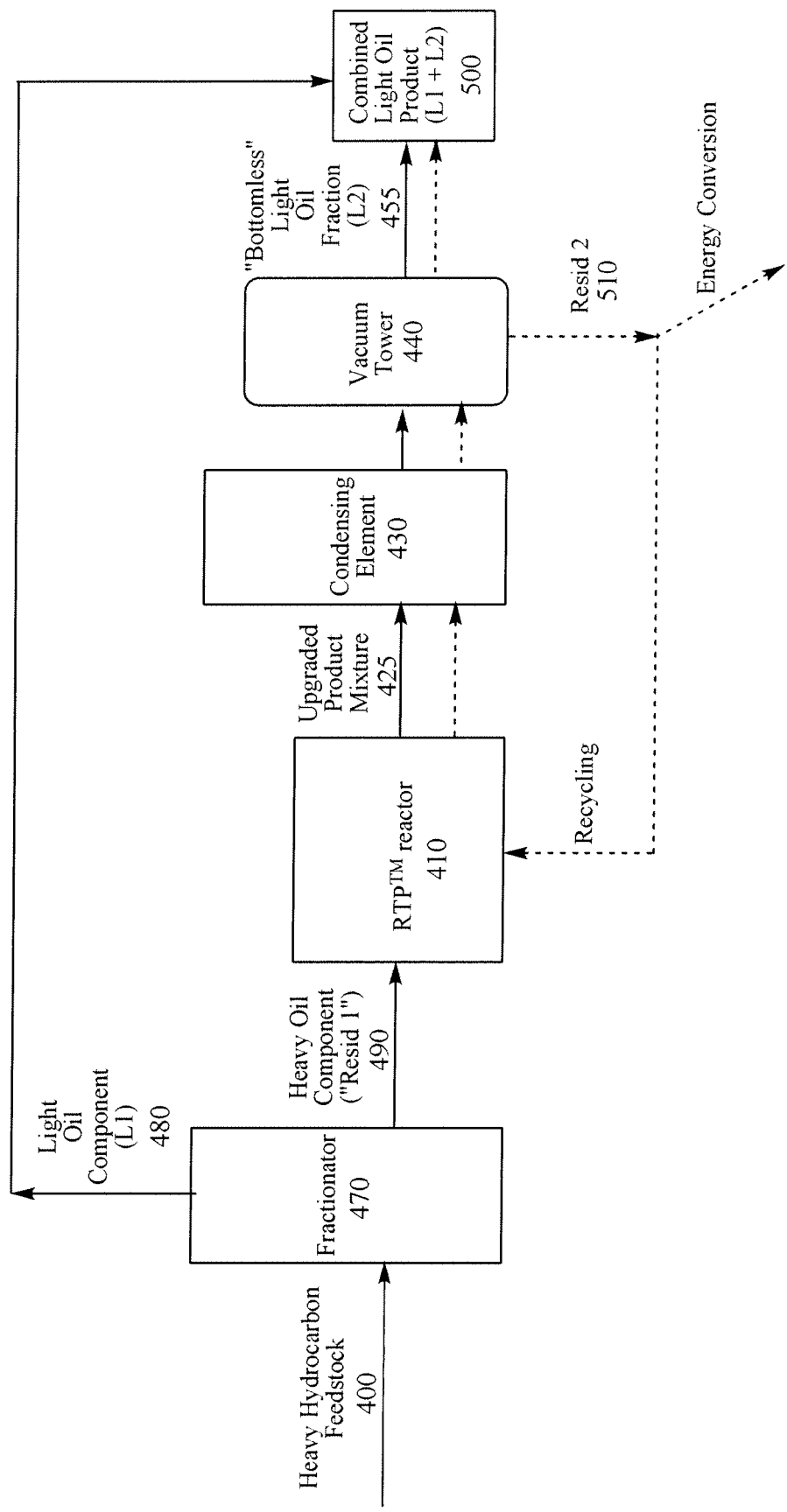

In a further example illustrated in FIG. 7, a heavy hydrocarbon feedstock (400) is first separated by a fractionator (470) into a light oil component (480; L1) and a heavy oil component (490; Resid 1). The heavy oil component (490) is then subjected to rapid thermal processing in an RTP™ reactor (410) according to the present invention to produce an upgraded product mixture (425), which is collected in one or more condensing elements (430), which are coupled with a vacuum tower (440). The vacuum tower (440) is then used to separate the upgraded product mixture (425) into a substantially bottomless light oil fraction (455; L2) and a heavy oil fraction (510; Resid 2). The two light oil fractions (L1 and L2) are then combined to form a light oil mixture (500). All or a fraction of the heavy fraction (510; Resid 2), or the product stream (upgraded product mixture produced from 425), may be converted into a form of energy (e.g. steam) for use by an oil production facility. Any of the heavy fraction (510; Resid 2), or product mixture, that is not converted into a form of energy may be recycled by rapid thermal processing to produce a further product mixture that can be separated using the vacuum tower (440) into a further amount of the bottomless light oil fraction (L2'), which may be combined with the light oil mixture (500).

In an alternative approach, the product stream (320, FIGS. 1, and 3-5) derived from the rapid thermal process as described herein can be fed directly to a second processing system for further upgrading by, for example but not limited to, FCC, visbreaking, hydrocracking or other catalytic cracking processes. The product derived from the application of the second system can then be collected, for example, in one or more condensing columns, as described above, or as typically used with these secondary processing systems. As another possibility, the product stream derived from the rapid thermal process described herein can first be condensed and then either transported, for example, by pipeline to the second system, or coupled directly to the second system.

As another alternative, a primary heavy hydrocarbon upgrading system, for example, FCC, visbreaking, hydrocracking or other catalytic cracking processes, can be used as a front-end processing system to partially upgrade the feedstock. The rapid thermal processing system of the present invention can then be used to either further upgrade the product stream derived from the front-end system, or used to upgrade vacuum resid fractions, bottom fractions, or other residual refinery fractions, as known in the art, that are derived from the front-end system (FCC, visbreaking, hydrocracking or other catalytic cracking processes), or both.

It is thought that the chemical upgrading of the feedstock that takes place within the reactor system as described above is in part due to the high loading ratios of heat carrier to feedstock that are used within the method of the present invention. Prior art carrier to feed ratios typically ranged from 5:1 to about 10:1. However, the carrier to feed ratios as described herein, are from about 10:1 to about 200:1, result in a rapid ablative heat transfer from the heat carrier to the feedstock. The high volume and density of heat carrier within the mixing and conversion zones, ensures that a more even processing temperature is maintained in the reaction zone. In this way, the temperature range required for the cracking process described herein is better controlled. This also allows for the use of relatively low temperatures to minimize over cracking, while ensuring that mild cracking of the feedstock is still achieved. Furthermore, with an increased volume of heat carrier within the reactor, contaminants and undesired components present in the feedstock and reaction by-products, including metals (e.g. nickel and vanadium), coke, and to some extent nitrogen and sulfur, are readily adsorbed due to the large surface area of heat carrier present. This ensures efficient and optimal removal of contaminants from the feedstock, during the pyrolytic processing of the feedstock. As a larger surface area of heat carrier is employed, the heat carrier itself is not unduly contaminated, and any adsorbed metal or coke and the like is readily stripped during regeneration of the heat carrier. With this system the residence times can be carefully regulated in order to optimize the processing of the feedstock and liquid product yields.

The liquid product arising from the processing of hydrocarbon oil as described herein has significant conversion of the resid fraction when compared to the feedstock. As a result the liquid product of the present invention, produced from the processing of heavy oil is characterized, for example, but which is not to be considered limiting, as having an API gravity of at least about 12, and more preferably of at least about 17. However, as indicated above, higher API gravities may be achieved with a reduction in volume. For example, one liquid product obtained from the processing of heavy oil using the method of the present invention is characterized as having from about 10 to about 15% by volume bottoms, from about 10 to about 15% by volume light ends, with the remainder as middle distillates.

The viscosity of the liquid product produced from heavy oil is substantially reduced from initial feedstock levels, of from 250 cSt @ 80° C., to product levels of 4.5 to about 10 cSt @ 80° C., or from about 6343 cSt @40° C., in the feedstock, to about 15 to about 35 cSt @40° C. in the liquid product. Following a Single pass process, liquid yields of greater than 80 vol % and API gravities of about 17, with viscosity reductions of at least about 25 times that of the feedstock are obtained (@40° C.

Similarly following the methods as described herein, a liquid product obtained from processing bitumen feedstock following a Single pass process, is characterized as having, and which is not to be considered as limiting, an increase in API gravity of at least about 10 (feedstock API is typically about 8.6). Again, higher API gravities may be achieved with a reduction in volume. The product obtained from bitumen is also characterised as having a density from about 0.93 to about 1.0 and a greatly reduced viscosity of at least about 20 fold lower than the feedstock (i.e. from about 15 g/ml to about 60 g/ml at 40° C. in the product, v. the feedstock comprising about 1500 g/ml). Yields of liquid product obtained from bitumen are at least 60% by vol, and preferably greater than about 75% by vol.

The liquid product produced as described herein also showed good stability. Over a 30 day period only negligible changes in SimDist profiles, viscosity and API for liquid products produced from either heavy oil or bitumen feedstocks were found (see Example 1 and 2).

Also as disclosed herein, further processing of the liquid product obtained from the process of heavy oil or bitumen feedstock may take place following the method of this invention. Such further processing may utilize conditions that are very similar to the initial fast pyrolysis treatment of the feedstock, or the conditions may be modified to enhance removal of lighter products (a single-stage or single pass process with a mild crack) followed by additional or more severe cracking of the recycled fraction.

In the first instance, that of further processing under similar conditions the liquid product from a first pyrolytic treatment is recycled back into the pyrolysis reactor to further upgrade the properties of the final product to produce a lighter product. In this arrangement the liquid product from the first round of pyrolysis is used as a feedstock for a second round of pyrolysis after the lighter fraction of the product has been removed from the product stream. Furthermore, a composite recycle may also be carried out where the heavy fraction of the product stream of the first process is fed back (recycled) into the reactor along with the addition of fresh feedstock (e.g. FIG. 3, described in more detail below).

In an example of a recycle or partial recycle process, a vacuum tower used in conjunction with the primary condensor or fractionation column is used to separate light liquid components from the primary feedstock and from the processed feedstock from relatively heavier resid components, and the combined light components are transported to the upflow reactor, where they are subjected to rapid thermal processing. The resid components may be used as an energy source for an oil production facility as described above, or be subjected to further processing to increase the yield of the lighter liquid components.

Recycle and partial recycle processing achieves high conversions of the resid fraction and upgrades the product liquid quality (such as its viscosity) more than it would be achievable via single stage processing. The recycled feedstock is exposed to conditions that mildly crack the hydrocarbon components in order to avoid overcracking and excess gas and coke production. An example of these conditions includes, but is not limited to, injecting the feedstock at about 150° C. into a hot gas stream comprise the heat carrier at the inlet of the reactor. The feedstock is processed with a residence time of less than about two seconds within the reactor at a temperature of between about 450° C. to about 600° C. Preferably, the residence time is from about 0.8 to about 1.3 seconds, and the reactor temperature is from about 480° C. to about 550° C. The product, comprising lighter materials (low boilers) is separated (100, and 180, FIG. 5), and removed in the condensing system (40). The heavier materials (240), separated out at the bottom of the condenser (40) are collected and reintroduced into the reactor (20) via line 270. Product gasses that exit the primary condenser (40) enter the secondary condenser (50) where a liquid product of reduced viscosity and high yield (300) is collected (see Example 5 for run analysis using this method). With recycled processing, the feedstock is recycled through the reactor to produce a product that can be collected from the condenser or internal fractionation step, thereby upgrading and optimizing the properties of the liquid product.

Alternate feeds systems may also be used as required for one, two, composite or multi stage processing. For example, a primary heavy hydrocarbon upgrading system, for example, FCC, visbreaking, hydrocracking or other catalytic cracking processes, can be used as a front-end processing system to partially upgrade the feedstock. The rapid thermal processing system of the present invention can then be used to either further upgrade the product stream derived from the front-end system, or used to upgrade vacuum resid fractions, bottom fractions, or other residual refinery fractions, as known in the art, that are derived from the front-end system (FCC, visbreaking, hydrocracking or other catalytic cracking processes), or both.

Therefore, the present invention also provides a method for processing a heavy hydrocarbon feedstock, as outlined in FIG. 5, where the feedstock (primary feedstock or raw feed) is obtained from the feed system (10), and is transported within line (280; which may be heated as previously described) to a primary condenser (40) or a fractionation column. The primary product obtained from the primary condenser/fractionation column may also be recycled back to the reactor (20) within a primary product recycle line (270). The primary product recycle line may be heated if required, and may also comprise a pre-heater unit (290) as shown in FIG. 5, to re-heat the recycled feedstock to desired temperature for introduction within the reactor (20).

Following the recycle process as outlined above and graphically represented in FIG. 5, product with yields of greater than 60, and preferably above 75% (wt %), and with the following characteristics, which are not to be considered limiting in any manner, may be produced from either bitumen or heavy oil feedstocks: an API from about 14 to about 19; viscosity of from about 20 to about 100 (cSt @40° C.); and a low metals content (see Example 5).

Collectively these results show that a substantial proportion of the components with low volatility in either of the feedstocks have been converted to components of higher volatility (light naphtha, kerosene and diesel) in the liquid product. These results demonstrate that the liquid product can be substantially upgraded to a quality suitable for transport by pipeline.

The above description is not intended to limit the claimed invention in any manner, furthermore, the discussed combination of features might not be absolutely necessary for the inventive solution.

The present invention will be further illustrated in the following examples. However it is to be understood that these examples are for illustrative purposes only, and should not to be used to limit the scope of the present invention in any manner.

Example 1

Heavy Oil (Single Pass)

Pyrolytic processing of Saskatchewan Heavy Oil and Athabasca Bitumen (see Table 1) were carried out over a range of temperatures using an upflow transport pyrolysis reactor.

TABLE 1

Characteristics of heavy oil and bitumen feedstocks

| Compound | Heavy Oil[1] | Bitumen[2] |
|---|---|---|
| Carbon (wt %) | 84.27 | 83.31 |
| Hydrogen (wt %) | 10.51 | 10.31 |
| Nitrogen (wt %) | <0.5 | <0.5 |
| Sulfur (st %) | 3.6 | 4.8 |
| Ash (wt %) | 0.02 | 0.02 |
| Vanadium (ppm) | 127 | 204 |
| Nickel (ppm) | 43 | 82 |
| Water content (wt %) | 0.8 | 0.19 |
| Gravity API° | 11.0 | 8.6 |
| Viscosity @ 40° C. (cSt) | 6500 | 40000 |
| Viscosity @ 60° C. (cSt) | 900 | 5200 |
| Viscosity @ 80° C. (cSt) | 240 | 900 |
| Aromaticity (C13 NMR) | 0.31 | 0.35 |

[1]Saskatchewan Heavy Oil
[2]Athabasca Bitumen (neat)

Briefly the conditions of processing include a reactor temperature from about 500° C. to about 620° C. Loading ratios for particulate heat carrier (silica sand) to feedstock of from about 20:1 to about 30:1 and residence times from about 0.35 to about 0.7 seconds. These conditions are outlined in more detail below (Table 2).

TABLE 2

Single pass processing of Saskatchewan Heavy Oil

| Reactor Temp ° C. | Viscosity @ 40° C. (cSt) | Yield wt % | Density @ 15 g/ml | API° | Yield Vol % |
|---|---|---|---|---|---|
| 620 | 4.6[1] | 71.5 | 0.977 | 13.3 | 72.7 |
| 592 | 15.2[1] | 74.5 | 0.970 | 14.4 | 76.2 |
| 590 | 20.2 | 70.8 | 0.975 | 13.6 | 72.1 |
| 590 | 31.6 | 75.8 | 0.977 | 13.3 | 77.1 |
| 560 | 10.0[1] | 79.9[2] | 0.963 | 15.4 | 82.3[2] |
| 560 | 10.0[1] | 83.0[3] | 0.963 | 16.2[3] | 86.3[3] |
| 550 | 20.8 | 78.5 | 0.973 | 14.0 | 80.3 |
| 550[4] | 15.7 | 59.8[2] | 0.956 | 16.5 | 61.5[2] |
| 550[4] | 15.7 | 62.0[3] | 0.956 | 18.3[2,3] | 65.1[3] |
| 530 | 32.2 | 80.9[2] | 0.962 | 15.7 | 82.8[2] |
| 530 | 32.2 | 83.8[3] | 0.962 | 16.6[3] | 87.1[3] |

[1]Viscosity @ 80° C.
[2]Yields do not include overhead condensing
[3]Estimated yields and API with overhead condensing
[4]Not all of the liquids were captured in this trial.

The liquid products of the runs at 620° C., 592° C. and 560° C. were analysed for metals, water and sulfur content. These results are shown in Table 3. Nickel, Vanadium and water levels were reduced 72, 69 and 87%, respectively, while sulfur and nitrogen remained the same or were marginally reduced. No metals were concentrated in the liquid product.

TABLE 3

Metal Analysis of Liquid Products (ppm)[1]

| Component | Saskatchewan Heavy Oil | Run @ 620° C. | Run @ 592° C. | Run @ 560° C. |
|---|---|---|---|---|
| Aluminum | <1 | <1 | 11 | <1 |
| Iron | <1 | 2 | 4 | <1 |
| Nickel | 44 | 10 | 12 | 9 |
| Zinc | 2 | <1 | 2 | 1 |
| Calcium | 4 | 2 | 3 | 1 |
| Magnesium | 3 | 1 | 2 | <1 |
| Boron | 21 | 42 | 27 | <1 |
| Sodium | 6 | 5 | 5 | 4 |
| Silicon | 1 | 10 | 140 | 4 |
| Vanadium | 127 | 39 | 43 | 39 |
| Potassium | 7 | 7 | <1 | 4 |
| Water (wt %) | 0.78 | 0.19 | 0.06 | .10 |
| Sulfur (wt %) | 3.6 | 3.5 | 3.9 | 3.5 |

[1]Copper, tin, chromium, lead, cadmium, titanium, molybdenum, barium and manganese all showed less than 1 ppm in feedstock and liquid products.

The gas yields for two runs are presented in Table 4.

TABLE 4

Gas analysis of Pyrolysis runs

| Gas (wt %) | Run @ 620° C. | Run @ 560° C. |
|---|---|---|
| Total Gas Yield | 11.8 | 7.2 |
| Ethylene | 27.0 | 16.6 |
| Ethane | 8.2 | 16.4 |
| Propylene | 30.0 | 15.4 |
| Methane | 24.0 | 21.0 |

The pour point of the feedstock improved and was reduced from 32° F. to about −54° F. The Conradson carbon reduced from 12. wt % to about 6.6 wt %.

Based on the analysis of these runs, higher API values and product yields were obtained for reactor temperatures of about 530 to about 560° C. At these temperatures, API gravities of 14 to 18.3, product yields of from about 80 to about 87 vol %, and viscosities of from about 15 to about 35 cSt (@40° C.) or about 10 cST (@80° C.) were obtained (the yields from the 550° C. run are not included in this range as the liquid yield capture was not optimized during this run). These liquid products reflect a significant degree of upgrading, and exhibit qualities suitable for pipeline transport.

Simulated distillation (SimDist) analysis of feedstock and liquid product obtained from several separate runs is given in Table 5. SimDist analysis followed the protocol outlined in ASTM D 5307-97, which reports the residue as anything with a boiling point higher than 538° C. Other methods for SimDist may also be used, for example HT 750 (NCUT; which includes boiling point distribution through to 750° C.). These results indicate that over 50% of the components within the feedstock evolve at temperatures above 538° C. These are high molecular weight components with low volatility. Conversely, in the liquid product, the majority of the components, approx 62.1% of the product are more volatile and evolve below 538° C.

TABLE 5

SimDist analysis of feedstock and liquid product after Single pass processing (Reactor temp 538° C.)

| Fraction | Temp (° C.) | Feedstock | R245 |
|---|---|---|---|
| Light Naphtha | <71 | 0.0 | 0.5 |
| Light/med Naphtha | 71-100 | 0.0 | 0.3 |
| Med Naphtha | 100-166 | 0.0 | 1.4 |
| Naphtha/Kerosene | 166-193 | 0.1 | 1.0 |
| Kerosene | 193-232 | 1.0 | 2.8 |
| Diesel | 232-327 | 8.7 | 14.2 |
| Light VGO | 327-360 | 5.2 | 6.5 |
| Heavy VGO | 360-538 | 33.5 | 35.2 |
| Vacuum Resid. | >538 | 51.5 | 37.9 |

The feedstock can be further characterized with approx. 0.1% of its components evolving below 193° C. (naphtha/kerosene fraction), v. approx. 6% for the liquid product. The diesel fraction also demonstrates significant differences between the feedstock and liquid product with 8.7% and 14.2% evolving at this temperature range (232-327° C.), respectively. Collectively these results show that a substantial proportion of the components with low volatility in the feedstock have been converted to components of higher volatility (light naphtha, kerosene and diesel) in the liquid product.

Stability of the liquid product was also determined over a 30 day period (Table 6). No significant change in the viscosity, API or density of the liquid product was observed of a 30 day period.

TABLE 6

Stability of liquid products after Single pass processing

| Fraction | Time = 0 | 7 days | 14 days | 30 days |
|---|---|---|---|---|
| Density @ 15.6° C. (g/cm³) | 0.9592 | 0.9590 | 0.9597 | 0.9597 |
| API (deg. API) | 15.9 | 15.9 | 15.8 | 15.8 |
| Viscosity @ 40° C. (cSt) | 79.7 | 81.2 | 81.2 | 83.2 |

Example 2

Bitumen (Single Pass)

Several runs using Athabasca Bitumen were conducted using the upflow transport pyrolysis reactor. The conditions of processing included a reactor temperature from 520 to about 590° C. Loading ratios for particulate heat carrier to feedstock of from about 20:1 to about 30:1, and residence times from about 0.35 to about 1.2 seconds These conditions, and the resulting liquid products are outlined in more detail below (Table 7).

TABLE 7

Single pass Processing with Undiluted Athabasca Bitumen

| Crack Temp | Viscosity @ 40° C. (cSt) | Yield wt % | Density @ 15° C. | Metals V (ppm)* | Metals Ni (ppm)** | API |
|---|---|---|---|---|---|---|
| 519° C. | 205 | 81.0 | nd | nd | nd | 13.0 |
| 525° C. | 201 | 74.4 | 0.979 | 88 | 24 | 12.9 |
| 528° C. | 278 | 82.7 | nd | nd | nd | 12.6 |
| 545° C. | 151 | 77.4 | 0.987 | 74 | 27 | 11.8 |
| 590° C. | 25.6 | 74.6 | 0.983 | nd | nd | 12.4 |

*feedstock V 209 ppm
**feedstock Ni 86 ppm

These results indicates that undiluted bitumen may be processed according to the method of this invention to produce a liquid product with reduced viscosity from greater than 40000 cSt (@40° C.) to about 25.6-200 cSt (@40° C. (depending on the run conditions; see also Tables 8 and 9), with yields of over 75% to about 85%, and an improvement in the product API from 8.6 to about 12-13. Again, as per Example 1, the liquid product exhibits substantial upgrading of the feedstock. SimDist analysis, and other properties of the liquid product are presented in Table 8, and stability studies in Table 9.

TABLE 8

Properties and SimDist analysis of feedstock and liquid product after Single pass processing (Reactor temp. 545° C.).

| Fraction | Temp (° C.) | Feedstock | R239 14 days | 30 days |
|---|---|---|---|---|
| Density @ 15.5° C. | — | — | 0.9871 | 0.9876 |
| API | — | — | 11.7 | 11.6 |
| Viscosity @ 40° C. | — | — | 162.3 | 169.4 |
| Light Naphtha | <71 | 0.0 | 0.2 | 0.1 |
| Light/med Naphtha | 71-100 | 0.0 | 0.2 | 0.2 |
| Med Naphtha | 100-166 | 0.0 | 1.5 | 1.4 |
| Naphtha/Kerosene | 166-193 | 0.1 | 1.0 | 1.0 |
| Kerosene | 193-232 | 0.9 | 3.1 | 3.0 |
| Diesel | 232-327 | 8.6 | 15.8 | 14.8 |
| Light VGO | 327-360 | 5.2 | 7.9 | 7.6 |
| Heavy VGO | 360-538 | 34.0 | 43.9 | 42.0 |
| Vacuum Resid. | >538 | 51.2 | 26.4 | 29.9 |

TABLE 9

Stability of liquid products after Single pass processing (reactor temperature 525° C.)

| Fraction | Temp (° C.) | R232 Feedstock | day 0 | 7 days | 14 days | 30 days |
|---|---|---|---|---|---|---|
| Density @ 15.6° C.* | — | 1.0095 | 0.979 | 0.980 | 0.981 | 0.981 |
| API | — | 8.5 | 12.9 | 12.7 | 12.6 | 12.6 |
| Viscosity @ 40° C.** | — | 30380 | 201.1 | 213.9 | 214.0 | 218.5 |
| Light Naphtha | <71 | 0.0 | 0.1 | 0.1 | 0.1 | 0.1 |
| Light/med Naphtha | 71-100 | 0.0 | 0.1 | 0.1 | 0.1 | 0.1 |
| Med Naphtha | 100-166 | 0.0 | 1.5 | 1.5 | 1.5 | 1.4 |
| Naphtha/Kerosene | 166-193 | 0.1 | 1.0 | 1.0 | 1.0 | 1.1 |
| Kerosene | 193-232 | 1.0 | 2.6 | 2.6 | 2.6 | 2.7 |
| Diesel | 232-327 | 8.7 | 14.1 | 14.1 | 14.3 | 14.3 |
| Light VGO | 327-360 | 5.2 | 7.3 | 7.3 | 7.4 | 7.4 |
| Heavy VGO | 360-538 | 33.5 | 41.3 | 41.3 | 41.7 | 42.1 |
| Vacuum Resid. | >538 | 51.5 | 32.0 | 32.0 | 31.2 | 30.8 |

*g./cm$^3$
**cSt

The slight variations in the values presented in the stability studies (Table 9 and other stability studies disclosed herein) are within the error of the test methods employed, and are acceptable within the art. These results demonstrate that the liquid products are stable.

These results indicate that over 50% of the components within the feedstock evolve at temperatures above 538° C. (vacuum resid fraction). This fraction is characterized by high molecular weight components with low volatility. Conversely, over several runs, the liquid product is characterized as comprising approx 68 to 74% of the product that are more volatile and evolve below 538° C. The feedstock can be further characterized with approx. 0.1% of its components evolving below 193° C. (naphtha/kerosene fraction), v. approx. 2.7 to 2.9% for the liquid product. The diesel fraction also demonstrates significant differences between the feedstock and liquid product with 8.7% (feedstock) and 14.1 to 15.8% (liquid product) evolving at this temperature range (232-327° C.). Collectively these results show that a substantial proportion of the components with low volatility in the feedstock have been converted to components of higher volatility (light naphtha, kerosene and diesel) in the liquid product. These results demonstrate that the liquid product is substantially upgraded, and exhibits properties suitable for transport.

Example 3

Composite/Recycle of Feedstock

Figure 3:
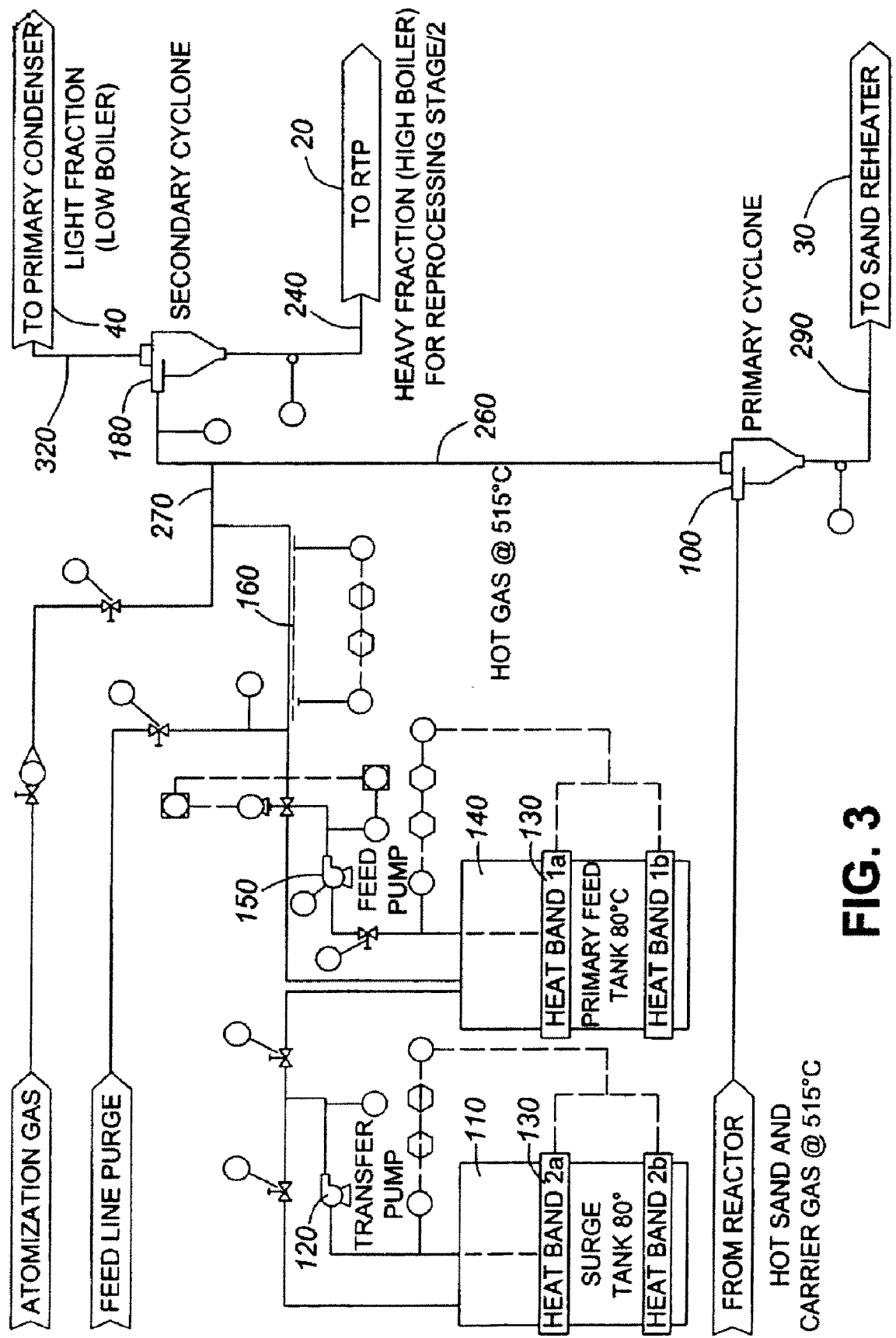
FIG. 3 is a schematic drawing of an example of an embodiment of the present invention relating to the feed system for introducing feedstock into the upgrading process using the system for the pyrolytic processing of feedstocks as described herein.
Figure 4:
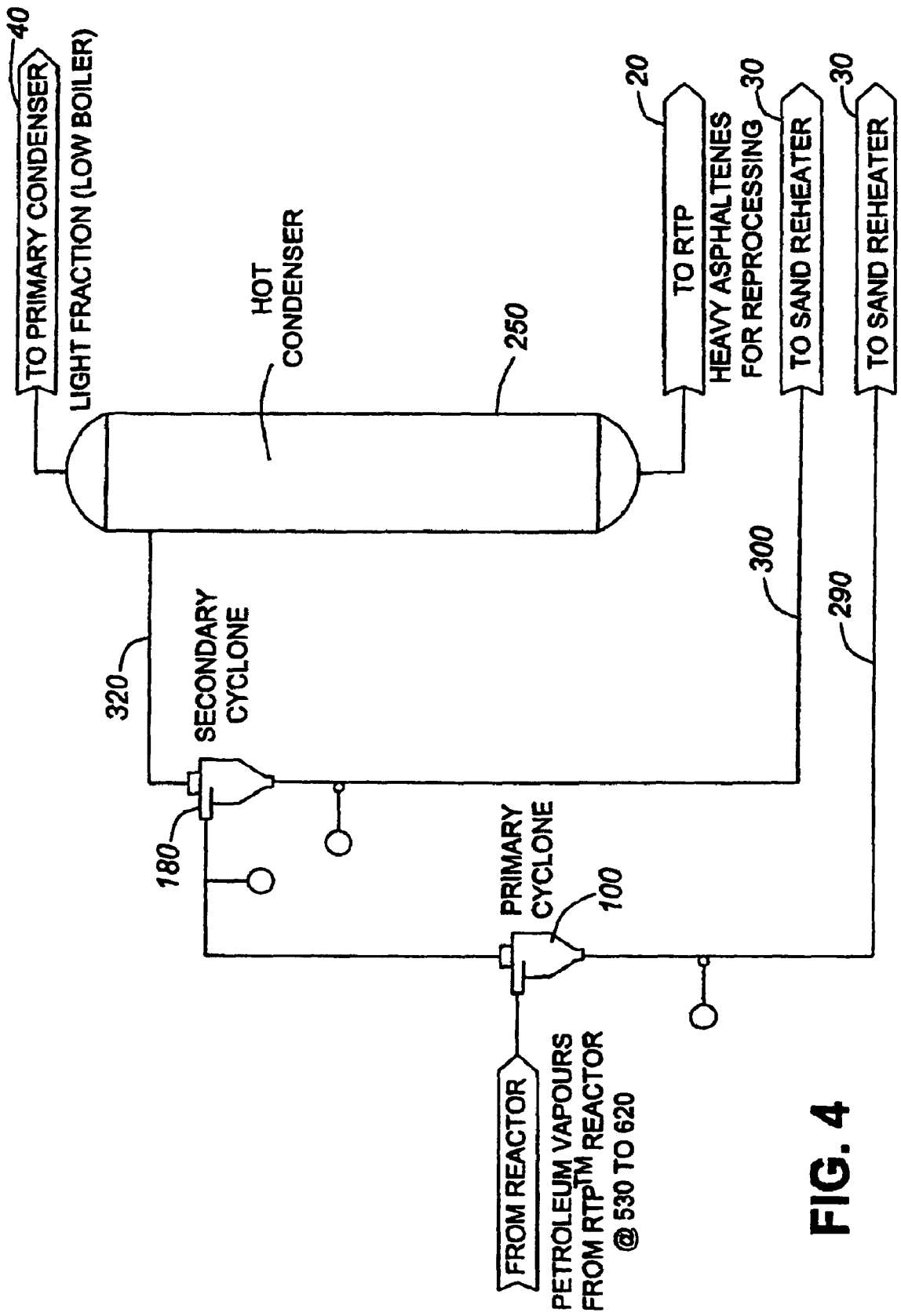
FIG. 4 is a schematic drawing of an example of an embodiment of the present invention relating to the recovery system for obtaining feedstock to be either collected from a primary condenser, or internal fractionation system and/or recycled back to the upflow reactor.

The upflow transport pyrolysis reactor may be configured so that the recovery condensers direct the liquid products into the feed line to the reactor (see FIGS. 3 and 4).

The conditions of processing included a reactor temperature ranging from about 530 to about 590° C. Loading ratios for particulate heat carrier to feedstock for the initial and recycle run of about 30:1, and residence times from about 0.35 to about 0.7 seconds were used. These conditions are outlined in more detail below (Table 10). Following pyrolysis of the feedstock, the lighter fraction was removed and collected using a hot condenser placed before the primary condenser (see FIG. 4), while the heavier fraction of the liquid product was recycled back to the reactor for further processing (also see FIG. 3). In this arrangement, the recycle stream (260) comprising heavy fractions was mixed with new feedstock (270) resulting in a composite feedstock (240) which was then processed using the same conditions as with the initial run within the pyrolysis reactor.

TABLE 10

Composite/Recycle operation using Saskatchewan Heavy Crude Oil and Undiluted Athabasca Bitumen

| Feedstock | Crack Temp ° C. | Yield Vol % | API° | Recycle[4] Yield vol % | Recycle[4] API° |
|---|---|---|---|---|---|
| Heavy Oil | 590 | 77.1[1] | 13.3 | 68.6 | 17.1 |
|  | 560 | 86.3[2] | 16.2 | 78.1 | 21.1 |
|  | 550 | 50.1[1] | 14.0 | 71.6 | 17.8 |
|  | 550 | 65.1[2,3] | 18.3 | 56.4 | 22.9 |
|  | 530 | 87.1[2] | 16.6 | 78.9 | 21.0 |
| Bitumen | 590 | 75.2[2] | 12.4 | 67.0 | 16.0 |

[1]Yield and API gravity include overhead condensing (actual)
[2]Yield and API gravity include overhead condensing (estimated)
[3]Not all of the liquid was recovered in this run
[4]These values represent the total recovery of product following the recycle run, and presume the removal of approximately 10% heavy fraction which is recycled to extinction. This is therefore a conservative estimate of yield as some of the heavy fraction will produce lighter components that enter the product stream, since not all of the heavy fraction will end up as coke.

The API gravity increased from 11.0 in the heavy oil feedstock to about 13 to about 18.5 after the first treatment cycle, and further increases to about 17 to about 23 after a second recycle treatment. A similar increase in API is observed for bitumen having a API of about 8.6 in the feedstock, which increase to about 12.4 after the first run and to 16 following the recycle run. With the increase in API, there is an associated increase in yield from about 77 to about 87% after the first run, to about 67 to about 79% following the recycle run. Therefore associated with the production of a lighter product, there is a decrease in liquid yield. However, an upgraded lighter product may be desired for transport, and recycling of liquid product achieves such a product.

Example 4

Recycle Treatment of Heavy Oil

Heavy oil or bitumen feedstock may also be processed using a recycle pyrolytic process which comprises a first stage where the feedstock is exposed to conditions that mildly crack the hydrocarbon components in order to avoid overcracking and excess gas and coke production. Lighter materials are removed following the processing in the first stage, and the remaining heavier materials are subjected to a more severe crack at a higher temperature. The conditions of processing within the first stage include a reactor temperature ranging from about 510 to about 530° C. (data for 515° C. given below), while in the second stage, a temperature from about 590 to about 800° C. (data for 590° C. presented in table 11)

was employed. The loading ratios for particulate heat carrier to feedstock range of about 30:1, and residence times from about 0.35 to about 0.7 seconds for both stages. These conditions are outlined in more detail below (Table 11).

TABLE 11

Two-Stage Runs of Saskatchewan Heavy Oil

| Crack Temp. ° C. | Viscosity @ 80° C. (cSt) | Yield wt % | Density @ 15° C. g/ml | API° | Yield Vol %[1] |
|---|---|---|---|---|---|
| 515 | 5.3 | 29.8 | 0.943 | 18.6 | 31.4 |
| 590 | 52.6 | 78.9 | 0.990 | 11.4 | 78.1 |
| 515 & 590 | Nd | nd | nd | 13.9 | 86.6 |

"nd" means not determined
[1]Light condensible materials were not captured. Therefore these values are conservative estimates.

These results indicate that a mild initial crack which avoids overcracking light materials to gas and coke, followed by a more severe crack of the heavier materials produces a liquid product characterized with an increased API, while still exhibiting good product yields.

Other runs using a recycle process, involved injecting the feedstock at about 150° C. into a hot gas stream maintained at about 515° C. and entering the reactor at about 300° C. (processing temperature). The product, comprising lighter materials (low boilers) was separated and removed following the first stage in the condensing system. The heavier materials, separated out at the bottom of the cyclone were collected subjected to a more severe crack within the reactor in order to render a liquid product of reduced viscosity and high yield. The conditions utilized in the second stage were a processing temperature of between about 530 to about 590° C. Product from the second stage was processed and collected.

Following such a recycle process the product of the first stage (light boilers) is characterized with a yield of about 30 vol %, an API of about 19, and a several fold reduction in viscosity over the initial feedstock. The product of the high boiling point fraction, produced following the processing of the recycle fraction in the recycle stage, is typically characterized with a yield greater than about 75 vol %, and an API gravity of about 12, and a reduced viscosity over the feedstock recycled fraction.

Example 5

Recycle Treatment of Heavy Oil and Bitumen, Using Feedstock for Quenching within Primary Condenser Heavy oil or bitumen feedstock may also be processed using a recycle pyrolytic process as outlined in FIG. 5. In this system, the upflow transport pyrolysis reactor is configured so that the primary recovery condenser directs the liquid product into the feed line back to the reactor, and feedstock is introduced into the system at the primary condenser where it quenches the product vapours produced during pyrolysis.

The conditions of processing included a reactor temperature ranging from about 530 to about 590° C. Loading ratios for particulate heat carrier to feedstock for the initial and recycle run of from about 20:1 to about 30:1, and residence times from about 0.35 to about 1.2 seconds were used. These conditions are outlined in more detail below (Table 12). Following pyrolysis of the feedstock, the lighter fraction is forwarded to the secondary condenser while the heavier fraction of the liquid product obtained from the primary condenser is recycled back to the reactor for further processing (FIG. 5).

TABLE 12

Charaterization of the liquid product obtained following Multi-Stage processing of Saskatchewan Heavy Oil and Bitumen

| Crack Temp. ° C. | Viscosity @ 40° C. (cSt) | Yield wt % | Density @ 15.6° C. g/ml | API° | Yield Vol %[1]) |
|---|---|---|---|---|---|
| Heavy Oil | | | | | |
| 543 | 80 | 62.6 | 0.9592 | 15.9 | 64.9 |
| 557 | 24 | 58.9 | 0.9446 | 18.2 | 62.1 |
| 561 | 53 | 70.9 | 0.9568 | 16.8 | 74.0 |
| Bitumen | | | | | |
| 538 | 40 | 61.4 | 0.9718 | 14.0 | 71.1 |

The liquid products produced from multi-stage processing of feedstock exhibit properties suitable for transport with greatly reduced viscosity down from 6343 cSt (@40° C.) for heavy oil and 30380 cSt (@40° C.) for bitumen. Similarly, the API increased from 11 (heavy oil) to from 15.9 to 18.2, and from 8.6 (bitumen) to 14.7. Furthermore, yields for heavy oil under these reaction conditions are from 59 to 68% for heavy oil, and 82% for bitumen.

TABLE 13

Properties and SimDist of liquid products prepared from Heavy Oil using the recycle Process (for feedstock properties see Tables 1 and 5).

| Fraction | Temp (° C.) | R241* Day 0 | Day 30 | R242** Day 30 | R244*** |
|---|---|---|---|---|---|
| Density @ 15.6° C. | — | 0.9592 | 0.9597 | 0.9465 | 0.9591 |
| API | — | 15.9 | 15.8 | 17.8 | 15.9 |
| Viscosity @ 40° C. | — | 79.7 | 83.2 | 25.0 | 49.1 |
| Light Naphtha | <71 | 0.0 | 0.2 | 0.3 | 0.3 |
| Light/med Naphtha | 71-100 | 0.0 | 0.1 | 0.2 | 0.3 |
| Med Naphtha | 100-166 | 0.1 | 0.4 | 2.5 | 1.8 |
| Naphtha/Kerosene | 166-193 | 0.6 | 0.6 | 1.8 | 1.5 |
| Kerosene | 193-232 | 2.8 | 2.5 | 5.0 | 3.5 |
| Diesel | 232-327 | 21.8 | 21.0 | 23.1 | 18.9 |
| Light VGO | 327-360 | 10.8 | 10.2 | 9.9 | 8.8 |
| Heavy VGO | 360-538 | 51.1 | 45.0 | 44.9 | 43.2 |
| Vacuum Resid. | >538 | 12.7 | 20.0 | 12.3 | 21.7 |

*reactor temp. 543° C.
**reactor temp. 557° C.
***reactor temp. 561° C.

Under these run conditions the API increased from 11 to about 15.9 to 17.8. Product yields of 62.6 (wt %; R241), 58.9 (wt %; R242) and 70.9 (wt %; R244) were achieved along with greatly reduced viscosity levels. These liquid products have been substantially upgraded over the feedstock and exhibit properties suitable for pipeline transport.

SimDist results indicate that over 50% of the components within the feedstock evolve at temperatures above 538° C. (vacuum resid fraction), while the liquid product is characterized as comprising approx 78 to 87% of the product that are more volatile and evolve below 538° C. The feedstock can be further characterized with approx. 0.1% of its components evolving below 193° C. (naphtha/kerosene fraction), v. approx. 1.3 to 4.8% for the liquid product. The kerosene and diesel fractions also demonstrates significant differences between the feedstock and liquid product with 1% of the feedstock fraction evolving between 193-232° C. v. 2.8 to 5% for the liquid product, and with 8.7% (feedstock) and 18.9 to 23.1% (liquid product) evolving at this temperature range (232-327° C.; diesel). Collectively these results show that a substantial proportion of the components with low volatility in the feedstock have been converted to components of higher volatility (light naphtha, kerosene and diesel) in the liquid product. These results demonstrate that the liquid product is substantially upgraded, and exhibits properties suitable for transport.

TABLE 14

Properties and SimDist of liquid products prepared from Bitumen following "Two Stage" processing (reactor temp. 538° C.; for feedstock properties see Tables 1, 8 and 9).

| Fraction | Temp (° C.) | R243 |
|---|---|---|
| Density @ 15.6° C. | — | 0.9737 |
| API | — | 13.7 |
| Viscosity @ 40° C. | — | 45.4 |
| Light Naphtha | <71 | 0.3 |
| Light/med Naphtha | 71-100 | 0.4 |
| Med Naphtha | 100-166 | 3.6 |
| Naphtha/Kerosene | 166-193 | 1.9 |
| Kerosene | 193-232 | 4.4 |
| Diesel | 232-327 | 19.7 |
| Light VGO | 327-360 | 9.1 |
| Heavy VGO | 360-538 | 41.1 |
| Vacuum Resid. | >538 | 19.5 |

Under these run conditions the API increased from 8.6 to about 14. A product yield of 68.4 (wt %) was obtained along with greatly reduced viscosity levels (from 30380 cSt @40° C. in the feedstock, to approx. 45 cSt in the liquid product).

Simulated distillation analysis demonstrates that over 50% of the components within the feedstock evolve at temperatures above 538° C. (vacuum resid fraction) while 80.5% of the liquid product evolves below 538° C. The feedstock can be further characterized with approx. 0.1% of its components evolving below 193° C. (naphtha/kerosene fraction), v. 6.2% for the liquid product. The diesel fraction also demonstrates significant differences between the feedstock and liquid product with 8.7% (feedstock) and 19.7% (liquid product) evolving at this temperature range (232-327° C.). Collectively these results show that a substantial proportion of the components with low volatility in the feedstock have been converted to components of higher volatility (light naphtha, kerosene and diesel) in the liquid product. These results demonstrate that the liquid product is substantially upgraded, and exhibits properties suitable for transport.

Example 6

Further Characterization of Vacuum Gas Oil (VGO)

Vacuum Gas Oil (VGO) was obtained from a range of heavy petroleum feedstocks, including:
Athabasca bitumen (ATB; ATB-VGO(243) and ATB-VGO (255))
a hydrotreated VGO from Athabasca bitumen (Hydro-ATB);
an Athabasca VGO resid blend (ATB-VGO resid);
a hydrotreated ATB-VGO resid (Hydro-ATB-VGO resid; obtained from the same run as ATB-255); and
a Kerrobert heavy crude (KHC).

The liquid product following thermal processing of the above feedstocks was distilled to produce a VGO fraction using standard procedures disclosed in ASTM D2892 and ASTM D5236.

For hydrotreating the Athabasca bitumen VGO, the reactor conditions were as follows:
reactor temperature 720° F.;
reactor pressure 1,500 psig;
Space Velocity 0.5;
Hydrogen rate 3625 SCFB.

Alaskan North Slope crude oil (ANS) was used for reference.

Properties of these VGOs are presented in Table 15.

TABLE 15

Properties of VGOs obtained from a variety of heavy oil feedstocks

| | ATB-VGO (243) | ATB-VGO (255) | ATB-VGO resid | KHC-VGO | ANS-VGO | Hydro-ATB-VGO |
|---|---|---|---|---|---|---|
| API Gravity | 13.8 | 15.2 | 11.8** | 15.5 | 21.7 | 22.4 |
| Sulfur, wt % | 3.93 | 3.76 | 4.11** | 3.06 | 1.1 | 0.27 |
| Aniline Point, ° F.* | 110 | 125 | 148-150 | 119 | 168 | 133.4 |

*for calculated aniline point see Table 17
**estimated

Cracking characteristics of each of the VGOs were determined using Microactivity testing (MAT) under the following conditions (also see Table 16):
reaction temperature 1000° F.;
Run Time 30 seconds;
Cat-to-oil-Ratio 4.5;
Catalyst Equilibrium FCC Catalyst.

The results from MAT testing are provided in Table 16, and indicate that cracking conversion for ATB-VGO (243), is approximately 63%, for KHC-VGO is about 6%, for ANS-VGO it is about 73%, and for Hydro-ATB-VGO is about 74%. Furthermore, cracking conversion for Hydro-ATB-VGO resid (obtained from ATB-255) is about 3% on volume higher than the VGO from the same run (i.e. ATB-VGO (255)). The modeling for the ATB-VGO and hydro-ATB-VGO incorporate a catalyst cooling device to maintain the regenerator temperature within its operating limits.

TABLE 16

Microactivity Testing (MAT) results

| | ATB-VGO243 | ATB-VGO-255 | KHC-VGO | ANS-VGO | Hydro-ATB-VGO 243 | ATB-VGO resid |
|---|---|---|---|---|---|---|
| Catalyst Charge (grams) | 4.5054 | 4.5137 | 4.5061 | 4.5064 | 4.5056 | 4.5238 |
| Feed Charge (grams) | 1.0694 | 1.055 | 1.0553 | 1.0188 | 1 | 1.0753 |
| Catalyst/Oil Ratio | 4.2 | 4.3 | 4.3 | 4.4 | 4.5 | 4.2 |

TABLE 16-continued

Microactivity Testing (MAT) results

|  | ATB-VGO243 | ATB-VGO-255 | KHC-VGO | ANS-VGO | Hydro-ATB-VGO 243 | ATB-VGO resid |
|---|---|---|---|---|---|---|
| Preheat Temperature (° F.) | 1015 | 1015 | 1015 | 1015 | 1015 | 1015 |
| Bed Temperature (° F.) | 1000 | 1000 | 1000 | 1000 | 1000 | 1000 |
| Oil Inject Time (seconds) | 30 | 30 | 30 | 30 | 30 | 30 |
| Conversion (Wt %) | 62.75% | 65.69% | 65.92% | 73.02% | 74.08% | 65.24% |
| Normalized (Wt %) | | | | | | |
| $H_2S$ | 2.22% | 2.28% | 1.90% | 0.79% | 0.13% | 2.43% |
| $H_2$ | 0.19% | 0.16% | 0.18% | 0.17% | 0.24% | 0.16% |
| $CH_4$ | 1.44% | 1.24% | 1.33% | 1.12% | 1.07% | 1.34% |
| $C_2H_2$ | 0.00% | 0.00% | 0.00% | 0.00% | 0.00% | 0.00% |
| $C_2H_4$ | 1.01% | 0.94% | 1.05% | 0.97% | 0.93% | 0.91% |
| $C_2H_6$ | 1.03% | 0.86% | 0.94% | 0.76% | 0.66% | 0.94% |
| $C_3H_4$ | 0.00% | 0.00% | 0.00% | 0.00% | 0.00% | 0.00% |
| $C_3H_6$ | 4.11% | 3.99% | 4.39% | 5.15% | 4.55% | 3.73% |
| $C_3H_6$ | 1.01% | 1.01% | 1.06% | 1.16% | 1.01% | 1.00% |
| $C_4H_6$ | 0.00% | 0.00% | 0.00% | 0.00% | 0.00% | 0.00% |
| $1\text{-}C_4H_8$ | 0.90% | 1.71% | 1.02% | 1.19% | 1.09% | 0.81% |
| $1\text{-}C_4H_8$ | 0.96% | 0.69% | 0.92% | 1.05% | 0.83% | 0.79% |
| $c\text{-}2\text{-}C_4H_8$ | 0.69% | 0.69% | 0.81% | 0.97% | 0.80% | 0.65% |
| $t\text{-}2\text{-}C_4H_8$ | 0.98% | 0.43% | 1.13% | 1.36% | 1.14% | 0.91% |
| $1\text{-}C_4H_{10}$ | 2.58% | 2.65% | 3.20% | 4.31% | 4.59% | 2.44% |
| $N\text{-}C_4H_{10}$ | 0.38% | 0.48% | 0.50% | 0.65% | 0.63% | 0.48% |
| C5-430° F. | 39.53% | 43.54% | 42.35% | 49.10% | 52.67% | 41.97% |
| 430° F.-650° F. | 23.29% | 22.50% | 22.30% | 18.75% | 18.92% | 22.60% |
| 650° F.-800° F. | 10.71% | 8.86% | 9.03% | 6.06% | 5.27% | 8.85% |
| 800° F. | 3.24% | 2.94% | 2.75% | 2.17% | 1.74% | 3.31% |
| Coke | 5.73% | 5.04% | 5.13% | 4.28% | 3.73% | 6.69% |
| Material Balance | 97.93% | 98.04% | 98.03% | 96.59% | 97.10% | 98.16% |

Aniline points were determined using ASTM Method D611. The results, as well as conversion and yield on the basis of vol % are presented in Table 17A and B. Similar results were obtained when compared on a wt % basis (data not shown). Cracking conversion for ATB-VGO (243) and KHC-VGO is 21% and 16% on volume lower that for ANS VGO. Hydrotreated ATB is 5% on volume lower that ANS-VGO.

TABLE 17A

Measured Aniline Point on a vol % basis

|  | ANS-VGO Vol % FF | ATB-VGO (243) Vol % FF | Hydro-ATB-VGO Vol % FF | KHC-VGO Vol % FF | ATB-VGO (255) Vol % FF |
|---|---|---|---|---|---|
| Fresh Feed Rate: MBPD | 68.6 | 68.6 | 68.6 | 68.6 | 68.6 |
| Riser Outlet Temperature ° F. | 971 | 971 | 971 | 971 | 971 |
| Fresh Feed Temperature ° F. | 503 | 503 | 503 | 503 | 503 |
| Regenerator Temperature ° F. | 1334 | 1609 | 1375 | 1562 | 1511 |
| Conversion | 73.85 | 53.01 | 68.48 | 57.58 | 56.53 |
| $C_2$ and Lighter, Wt % FF | 4.13 | 8.19 | 4.53 | 7.70 | 7.37 |
| $H_2S$ | 0.54 | 1.37 | 0.12 | 1.18 | 1.35 |
| $H_2$ | 0.18 | 0.21 | 0.22 | 0.25 | 0.20 |
| Methane | 1.35 | 2.87 | 1.65 | 2.65 | 2.45 |
| Ethylene | 1.00 | 1.37 | 1.31 | 1.51 | 1.31 |
| Ethane | 1.07 | 2.36 | 1.23 | 2.11 | 2.06 |
| Total $C_3$ | 9.41 | 7.15 | 10.01 | 8.18 | 7.50 |
| Propylene | 7.37 | 5.79 | 7.81 | 6.54 | 6.06 |
| Propane | 2.04 | 1.35 | 2.20 | 1.64 | 1.44 |
| Total $C_4$ | 13.79 | 9.35 | 13.05 | 11.57 | 10.34 |
| Isobutane | 4.25 | 2.40 | 4.85 | 3.21 | 2.65 |
| NButane | 1.08 | 0.35 | 1.07 | 0.53 | 0.39 |
| Total Butanes | 8.46 | 6.60 | 7.13 | 7.83 | 7.30 |
| Gasoline (C5-430° F.) | 58.46 | 35.35 | 51.56 | 39.43 | 38.58 |
| LCGO (430-650° F.) | 20.78 | 34.74 | 27.08 | 32.06 | 32.05 |
| HCGO + DO (650° F.) | 5.37 | 12.25 | 4.44 | 10.36 | 11.42 |
| Coke, Wt % | 5.50 | 5.835.50 | 5.53 | 5.82 | 5.70 |
| API Gravity | 21.7 | 13.9 | 22.4 | 15.5 | 15.2 |
| Aniline Point: ° F. (Measured) | 168 | 110 | 133.4 | 119.0 | 125 |

The difference in the conversion for ATB-VGO, KHC-VGO and Hydro-ATB-VGO relative to ANS-VGO (control) listed in Table 17A is larger than expected, when the results of the MAT test (Table 16) are considered. This true for ATB-VGO (243), (255), KHC-VGO, Hydro-ATB-VGO, ATB-VGO-resid, and Hydro ATB-VGO-resid. To determine if the measured aniline point is not a reliable indicator of the ATB-, KHC- and Hydro-VGOs, the aniline point was calculated using standard methods known in the art based, upon distillation data and API gravity. The calculated aniline points, and cracking conversion for the various VGO's are presented in Tables 17B and C.

TABLE 17B

Calculated Aniline Point on a vol % basis

| | ANS-VGO) Vol % FF | ATB-VGO (243) Vol % FF | Hydro-ATB-VGO Vol % FF | KHC-VGO Vol % FF |
|---|---|---|---|---|
| Fresh Feed Rate: MBPD | 68.6 | 68.6 | 68.6 | 68.6 |
| Riser Outlet Temperature ° F. | 971 | 971 | 971 | 971 |
| Fresh Feed Temperature ° F. | 503 | 503 | 503 | 503 |
| Regenerator Temperature ° F. | 1334 | 1464 | 1272 | 1383 |
| Conversion | 73.85 | 57.45 | 74.25 | 62.98 |
| $C_2$ and Lighter, Wt % FF | 4.13 | 6.79 | 3.53 | 6.05 |
| $H_2S$ | 0.54 | 1.40 | 0.13 | 1.25 |
| $H_2$ | 0.18 | 0.17 | 0.18 | 0.16 |
| Methane | 1.35 | 2.14 | 1.21 | 1.86 |
| Ethylene | 1.00 | 1.19 | 1.07 | 1.20 |
| Ethane | 1.07 | 1.89 | 0.94 | 1.57 |
| Total $C_3$ | 9.41 | 7.33 | 10.10 | 8.27 |
| Propylene | 7.37 | 5.93 | 8.10 | 6.59 |
| Propane | 2.04 | 1.40 | 2.00 | 1.68 |
| Total $C_4$ | 13.79 | 10.76 | 15.26 | 12.18 |
| Isobutane | 4.25 | 2.75 | 5.01 | 3.37 |
| N-Butane | 1.08 | 0.41 | 1.18 | 0.54 |
| Total Butanes | 8.46 | 7.60 | 9.07 | 8.27 |
| Gasoline ($C_5$-430° F.) | 58.46 | 39.71 | 57.07 | 45.57 |
| LCGO (430-650° F.) | 20.78 | 30.85 | 22.20 | 27.70 |
| HCGO + DO (650° F.) | 5.37 | 11.70 | 3.55 | 9.32 |
| Coke, Wt % FF | 5.50 | 5.56 | 5.33 | 5.46 |
| API Gravity (Feed) | 21.7 | 13.8 | 22.4 | 15.5 |
| Aniline Point: ° F. (Calc) | 168 | 135.0 | 158.0 | 144.0 |

TABLE 17C

Calculated Aniline Point on a vol % basis, continued

| | ATB-VGO (255) Vol % FF | Hydro-ATB-VGO (255) Vol % FF | ATB-VGO resid Vol % FF | Hydro ATB-VGO resid Vol % FF |
|---|---|---|---|---|
| Fresh Feed Rate: | 68.6 | 68.6 | 68.6 | 68.6 |
| Riser Outlet Temperature ° F. | 971 | 971 | 971 | 971 |
| Fresh Feed Temperature ° F. | 503 | 503 | 503 | 503 |
| Regenerator Temperature ° F. | 1374 | 1238 | 1345* | 1345* |
| Conversion | 60.86 | 75.29 | 83.82 | 72.34 |
| $C_2$ and Lighter | 6.13 | 3.36 | 4.80 | 4.13 |
| $H_2S$ | 1.42 | 0.12 | 1.55 | 0.04 |
| $H_2$ | 0.14 | 0.17 | 0.18 | 0.60 |
| Methane | 1.85 | 1.13 | 1.43 | 1.56 |
| Ethylene | 1.10 | 1.04 | 0.48 | 0.79 |
| Ethane | 1.63 | 0.89 | 1.17 | 1.14 |
| Total $C_3$ | 7.54 | 10.44 | 7.66 | 8.49 |
| Propylene | 6.07 | 8.62 | 5.97 | 6.76 |
| Propane | 1.47 | 1.82 | 1.69 | 1.73 |
| Total $C_4$ | 11.58 | 16.56 | 12.99 | 12.60 |
| Isobutane | 2.96 | 4.96 | 3.34 | 3.75 |
| N-Butane | 0.44 | 1.19 | 0.49 | 0.99 |

TABLE 17C-continued

Calculated Aniline Point on a vol % basis, continued

| | ATB-VGO (255) Vol % FF | Hydro-ATB-VGO (255) Vol % FF | ATB-VGO resid Vol % FF | Hydro ATB-VGO resid Vol % FF |
|---|---|---|---|---|
| Total Butanes | 8.18 | 10.40 | 9.16 | 7.85 |
| Gasoline ($C_5$-430° F.) | 43.38 | 56.87 | 45.61 | 56.66 |
| LCGO (430-650° F.) | 28.61 | 21.09 | 26.28 | 21.59 |
| HCGO + DO (650° F.) | 10.52 | 3.62 | 9.89 | 6.06 |
| Coke, Wt % FF | 5.43 | 5.30 | 7.54 | 6.42 |
| API Gravity (Feed) | 15.2 | 23.9 | 11.8 | 20.0 |
| Aniline Point ° F. (Cacl) | 145 | 168 | 148.0 | 170.0 |

Based upon the calculated aniline points, the aniline point all increased and are more in keeping with the data determined from MAT testing. For example, the aniline point of:
ATB-VGO (243) is 135° F.,
ATB-VGO (255) is 145° F.,
KHC-VGO is 144° F.,
ATB-VGO-resid is 148° F.,
Hydro-ATB-VGO is 158° F., and
Hydro-ATB-VGO-resid is 170° F.

There is no change in the aniline point or product yield for the ANS-VGO (control). Along with the increased calculated aniline points were increased product yields are consistent with the cracking differences MAT results of Table 16.

These results indicate that RTP product VGOs have a plurality of side chains available for cracking, and provide higher levels of conversion than those derived from the aniline point measurements.

The present invention has been described with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. A method of producing an upgraded product from a heavy hydrocarbon feedstock, comprising:
 a) upgrading a heavy hydrocarbon feedstock by a method comprising:
  i) providing a particulate heat carrier into an upflow reactor;
  ii) introducing the heavy hydrocarbon feedstock into the upflow reactor at least one location above that of the particulate heat carrier so that a loading ratio of the particulate heat carrier to the heavy hydrocarbon feedstock is from about 10:1 to about 200:1, wherein the upflow reactor is run at a temperature of from about 300° C. to about 700° C., and
  iii) allowing the heavy hydrocarbon feedstock to interact with the particulate heat carrier with a residence time of less than about 20 seconds, to produce a product mixture comprising a product stream and the particulate heat carrier;
 b) separating the product stream from the particulate heat carrier;
 c) obtaining a gaseous product and a liquid product mixture from the product stream, the liquid product mixture comprising a light fraction and a heavy fraction;

d) obtaining an upgraded bottomless product from the liquid product mixture using a vacuum tower; and e) recycling at least a portion of the heavy fraction of the liquid product mixture from the vacuum tower to the upflow reactor.

2. The method of claim 1, wherein the recycled heavy fraction is mixed with the particulate heat carrier, wherein the particulate heat carrier is at a temperature at about, or above, that used in the step of upgrading (step a).

3. The method of claim 1, wherein the method further includes mixing the heavy fraction with the particulate heat carrier, wherein the particulate heat carrier of the recycled pyrolysis run is at a temperature at about, or above, that used in the step of upgrading (step a).

4. The method of claim 1, wherein the product stream is treated within a hot condenser prior to obtaining the light fraction and the heavy fraction.

5. The method of claim 1, wherein the heavy hydrocarbon feedstock is either heavy oil or bitumen.

6. The method according to claim 1, wherein the upflow reactor run at a temperature in the range from about 450° C. to about 600° C.

7. The method of claim 1, wherein the reactor is run at a temperature in the range from about 480° C. to about 550° C.

8. The method of claim 1, wherein in the step of introducing (step a)ii)), the loading ratio is from about 20:1 to about 30:1.

9. The method of claim 1, wherein prior to the step of upgrading, the feedstock is introduced into a fractionation column that separates a volatile component of the feedstock from a liquid component of the feedstock, and the liquid component is subjected to upgrading (step a).

10. The method of claim 1, wherein prior to the step of upgrading, the feedstock is introduced into a fractionation column that separates a volatile component of the feedstock from a liquid mixture derived from the feedstock, the liquid mixture comprising a light component and a heavy component, wherein the heavy component is subjected to the step of upgrading (step a), and the light component is combined with the light fraction derived from the vacuum tower following the step of obtaining (step c).

11. The method of claim 1, wherein the bottomless product contains less than 5% of the heavy fraction present in the liquid product mixture.

12. The method of claim 1, wherein the bottomless product contains less than 1% of the heavy fraction present in the liquid product mixture.

* * * * *